(12) United States Patent
Sugiura

(10) Patent No.: US 8,421,612 B2
(45) Date of Patent: Apr. 16, 2013

(54) VEHICULAR SYSTEM FOR PROVIDING TIRE PRESSURE ON A PORTABLE HANDSET INCLUDING USE OF THE VEHICLE'S ENTRY SYSTEM

(75) Inventor: Masahiro Sugiura, Takahama (JP)

(73) Assignee: Denso Corporation, Kariya (JP)

( * ) Notice: Subject to any disclaimer, the term of this patent is extended or adjusted under 35 U.S.C. 154(b) by 568 days.

(21) Appl. No.: 12/658,558

(22) Filed: Feb. 11, 2010

(65) Prior Publication Data

US 2010/0207753 A1 Aug. 19, 2010

(30) Foreign Application Priority Data

Feb. 16, 2009 (JP) ................................ 2009-033102

(51) Int. Cl.
*G08B 21/00* (2006.01)

(52) U.S. Cl.
USPC .......... 340/447; 340/442; 340/5.72; 73/146.5

(58) Field of Classification Search .......... 340/442–448, 340/5.72; 14/146.2–146.8; 73/146.2–146.8
See application file for complete search history.

(56) References Cited

U.S. PATENT DOCUMENTS

| | | | |
|---|---|---|---|
| 2001/0050611 A1* | 12/2001 | Achterholt | 340/442 |
| 2002/0030592 A1* | 3/2002 | Hakanen et al. | 340/442 |
| 2008/0157919 A1 | 7/2008 | Sugiura et al. | |
| 2008/0204281 A1 | 8/2008 | Sugiura et al. | |
| 2009/0079652 A1 | 3/2009 | Kawase et al. | |

FOREIGN PATENT DOCUMENTS

| | | |
|---|---|---|
| JP | 2001-191768 | 7/2001 |
| JP | 2005-186659 | 7/2005 |
| JP | 2005-254932 | 9/2005 |
| JP | 2008-163633 | 7/2008 |
| JP | 2008-213514 | 9/2008 |
| JP | 2009-078659 | 4/2009 |

\* cited by examiner

*Primary Examiner* — Jeffery Hofsass
(74) *Attorney, Agent, or Firm* — Harness, Dickey & Pierce, P.L.C.

(57) ABSTRACT

An in-vehicle apparatus allows the user to check and adjust tire pressure whenever he/she thinks of doing it, by transmitting, from a portable unit that is carried by the user, a start request signal through UHF band electric wave to forcefully operate sensor units for detecting the tire pressure in each of the tires of the automobile, by collecting the tire pressure information to a control unit of the in-vehicle apparatus, and by displaying the tire pressure on a display unit of the portable unit when the tire pressure information is transmitted from a Bluetooth unit of the in-vehicle apparatus to a Bluetooth unit of the portable unit.

20 Claims, 13 Drawing Sheets

VEHICULAR SYSTEM FOR PROVIDING TIRE PRESSURE ON A PORTABLE HANDSET INCLUDING USE OF THE VEHICLE'S ENTRY SYSTEM

CROSS REFERENCE TO RELATED APPLICATION

The present application is based on and claims the benefit of priority of Japanese Patent Application No. 2009-33102, filed on Feb. 16, 2009, the disclosure of which is incorporated herein by reference.

FIELD OF THE INVENTION

The present disclosure generally relates to a vehicular system and a handset of the vehicular system for monitoring tire pressure of a vehicle.

BACKGROUND INFORMATION

Conventionally, the tire pressure monitoring system (TPMS) detects the tire pressure and warns the driver by a warning display on a meter panel when the detected tire pressure is lower than a threshold. Besides, as disclosed in Japanese patent document JP-A-2005-254932, or other Japanese patent documents such as JP-A-2008-163633 (i.e., now available as US 20080157919) and JP-A-2008-213514 (i.e., now available as US 200800204281), some monitoring systems display the detected tire pressure as a short-term pressure transition graph on a display of a navigation system, based on the tire pressure detected by pressure detectors disposed on each of the tires.

Further, tire pressure is, in association with an economical travel of the vehicle, now more frequently checked for the increase of the fuel mileage. That is, in other words, tire pressure adjustments performed by the driver in an easy manner are now highly recommended and desired.

However, the TPMS is generally designed to warn the driver of the decrease of the tire pressure during the travel of the vehicle, thereby making it impossible to detect the tire pressure while the ignition switch of the vehicle is turned off. Moreover, the detected tire pressure can, only be displayed on a meter panel of the vehicle. Therefore, in order to check the tire pressure by using the conventional TPMS, the driver must first turn on the ignition switch of the vehicle and then peek into the meter panel.

Further, the conventional TPMS in the above Japanese patent document (i.e., the first one) displays the graph (i.e., the tire pressure information) on the display of the navigation system. Therefore, the tire pressure information cannot be viewed when the ignition switch of the vehicle is not turned on (i.e., when the navigation system is not having a power supply). In other words, the power supply for the navigation system has to be turned on by the ignition switch, only for the display of the tire pressure information. The user may otherwise use a tire gauge for checking the tire pressure. In this case, the user must purchase the tire gauge by him/herself.

That is, in other words, the conventional TPMS does not allow the user to easily and promptly check the tire pressure.

SUMMARY OF THE INVENTION

In view of the above and other problems, the present disclosure provides a vehicular system and a handset of the vehicular system which allow the user to easily and promptly check the tire pressure without hassles when the user feels like adjusting the tire pressure.

In an aspect of the present disclosure, the vehicular system includes: a pressure detector for detecting a tire pressure of a vehicle; and a handset that is carried by a user. Further, the handset of the vehicular system includes: a transmission unit for wirelessly transmitting a forced-operation signal to forcefully operate the pressure detector; and a receiver unit for wirelessly receiving tire pressure information detected by the pressure detector.

In the above system, the pressure detector is forcefully operated for detecting the tire pressure by the signal from the handset that is carried by the user, and the detected tire pressure is acquired by the handset through wireless communication from the pressure detector, thereby enabling the user to easily check the tire pressure without turning on the ignition switch and peeking into the meter panel, nor without using the tire gauge.

In other words, whenever the user feels like checking/adjusting the tire pressure, the user can easily and promptly check and adjust the tire pressure.

Further, the handset of a vehicular system which is carried by a user includes: a transmission unit for wirelessly transmitting a forced-operation signal to forcefully operate a pressure detector disposed in a vehicle; a receiver unit for wirelessly receiving tire pressure information detected by the pressure detector; and a display unit in the handset for displaying the tire pressure information received by the receiver unit.

The handset of a vehicular system which is carried by a user may alternatively includes: a handset transmission unit for wirelessly transmitting a forced-operation signal to forcefully operate a pressure detector disposed in a vehicle; a handset receiver unit for wirelessly receiving tire pressure information detected by the pressure detector; and a mediation unit for wirelessly transmitting the tire pressure information received by the receiver unit to a communication terminal having a terminal display for displaying the tire pressure information received by the handset receiver unit.

The handset having the above configuration enables the user to easily and promptly check the tire pressure, without hassles such as tuning on the ignition switch or using the tire gauge.

Further, the handset carried by the user enables the user to display and check the tire pressure at hand, thereby allowing the user to adjust the tire pressure without peeking into the meter panel or the display of the navigation system.

For example, the user can display the tire pressure on the display unit of the handset for the checking and the adjustment of the pressure at hand. Or, the user can transmit information of the tire pressure from the handset to the communication terminal that is also carried at hand by the user for the checking and the adjustment of the pressure.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
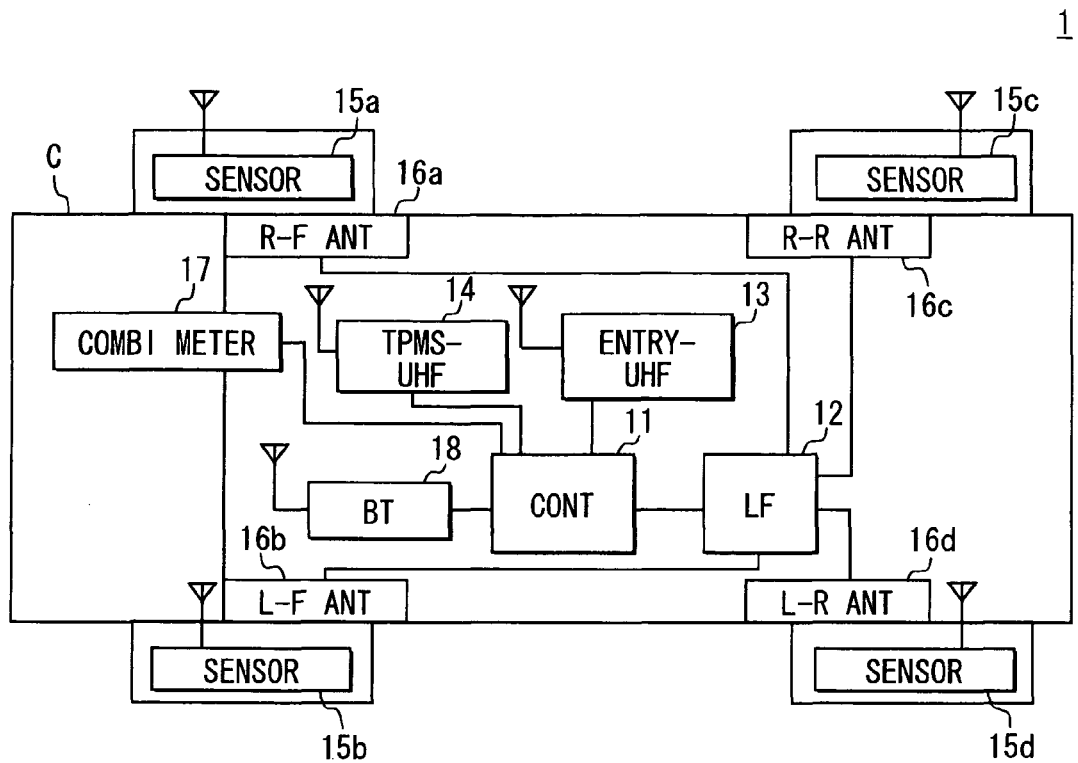
FIG. 1 is a block diagram showing schematic configuration of an in-vehicle apparatus in a first embodiment of the present disclosure.

An embodiment of the present invention is explained with reference to FIGS. 1 to 6 in the following.

Vehicle system 100 of the present invention includes in-vehicle apparatus 1 disposed on vehicle C and handset 2 carried by a user, and in-vehicle apparatus 1 has a so-called smart entry function to perform the unlocking control of the vehicle doors when handset 2 enters a wireless communication area around vehicle C and a so-called remote keyless entry function to lock/unlock the vehicle doors according to the operation of push switches 26, 27 on handset 2. In this embodiment and subsequent embodiments, handset 2 is, in the drawings, denoted as portable unit 2 or the like, for emphasizing its portability by the user.

First, with reference to FIG. 1, schematic configuration of in-vehicle apparatus 1 is explained. FIG. 1 is a block diagram showing schematic configuration of in-vehicle apparatus 1. In-vehicle apparatus 1 includes control unit 11, LF transmission unit 12, UHF transmission and reception unit 13 for an entry system, UHF reception unit 14 of TPMS (tire pressure monitoring system), sensor units 15a to 15d, right front wheel antenna (right front wheel ANT in the following) 16a, left front wheel antenna (left front wheel ANT in the following) 16b, right rear wheel antenna (right rear wheel ANT in the following) 16c, left rear wheel antenna (left rear wheel ANT in the following) 16d, combination meter 17 and Bluetooth (a registered trademark) communication unit 18 as shown in FIG. 1.

Control unit 11 comprising, as a main part, a microcomputer which has CPU, ROM, RAM, backup RAM, input/output (not illustrated) carries out various processes by executing various control programs memorized in the ROM. For example, control unit 11 carries out a process about the above-mentioned smart entry function and remote keyless entry function. In addition, control unit 11 carries out a monitoring process as well as a collection process and a transfer process respectively to be mentioned later in detail.

LF transmission unit 12 has an LF antenna, and a signal (i.e., information) is transmitted to handset 2 by the electric wave in LF band (for example, 30 kHz to 300 kHz) through this LF antenna. The signal transmitted from LF transmission unit 12 has a limited coverage area, through door antennas arranged in multiple places, for example, in each of the doors of vehicle C and arranged at the outside of the back door and at the inside of the vehicle (antennas not illustrated). In addition, LF transmission unit 12 transmits a transmission request signal which has been sent through communication line from control unit 11 to right front wheel ANT 16a, left front wheel ANT 16b, right rear wheel ANT 16c and left rear wheel ANT 16d, and further outputs the signal to each of sensor units 15a to 15d wirelessly in the electric wave of LF band.

In the present embodiment, LF transmission unit 12 is configured to output the transmission request signal to sensor units 15a to 15d, in addition to transmitting the signal from control unit 11 to each of right front wheel ANT 16a, left front wheel ANT 16b, right rear wheel ANT 16c and left rear wheel ANT 16d. However, the signal may alternatively be transmitted through the communication line from control unit 11 to each of right front wheel ANT 16a, left front wheel ANT 16b, right rear wheel ANT 16c and left rear wheel ANT 16d via a different device, which is separately disposed from LF transmission unit 12.

UHF transmission and reception unit 13 of the entry system has a UHF antenna, and the signal is transmitted and received through this antenna to in-vehicle apparatus 1 and from handset 2 by the electric wave of UHF band (e.g., a portion of frequency band between 300 MHz to 3 GHz). In addition, UHF transmission and reception unit 13 of the entry system is connected to control unit 11, and information output from this control unit 11 is transmitted from the UHF antenna, and information received by the UHF antenna is output to control unit 11. In addition, UHF transmission and reception unit 13 of the entry system receives a start request signal which has been transmitted from handset 2, and outputs the signal to control unit 11.

UHF reception unit 14 of TPMS has the UHF antenna, and a signal (i.e., information) which has been transmitted by the electric wave of UHF band (e.g., a portion of frequency band between 300 MHz to 3 GHz) from sensor units 15a to 15d is received by the UHF antenna. In addition, UHF reception unit 14 of TPMS is connected to control unit 11, and a transmission signal which has been transmitted from sensor units 15a to 15d in response to the transmission request signal by the electric wave of UHF band is received by UHF reception unit 14 and is output to control unit 11.

In addition, UHF transmission and reception unit 13 of the entry system and UHF transmission unit 14 of TPMS both receive a signal (i.e., information) which has been transmitted by the electric wave of UHF band by the UHF antenna. However, both units 13 and 14 use respectively different UHF frequencies for avoiding interference.

Sensor units 15a to 15d are disposed on different wheels (i.e., tires) of vehicle C. That is, for example, sensor unit 15a is disposed on a right front wheel, sensor unit 15b is disposed on a left front wheel, sensor unit 15c is disposed on a right rear wheel, and sensor unit 15d is disposed on a left rear wheel. Further, for example, sensor units 15a to 15d are integrally formed with tire valves in a single body, and are installed on the disk wheels of the tires. Each of sensor units 15a to 15d includes a pressure sensor for detecting a pressure in the tire, a wireless communication unit for wirelessly receiving and transmitting information (e.g., receiving the signal in LF band wave and transmitting the signal in UHF, band wave), and a microcomputer for transmitting tire pressure information of the detected tire pressure together with a transmission signal including an ID code for identifying each tire by controlling the wireless communication unit (components in the sensor unit not illustrated). Thus, the wireless communication unit serves as a wireless communication unit in claims. In addition, sensor units 15a to 15d detect tire pressure by the pressure sensor, and transmit the transmission signal whenever sensor units 15a to 15d receive the transmission request signal from antennas 16a to 16d in LF band wave by the wireless communication unit.

In addition, control unit 11 receives, through UHF reception unit 14 of TPMS, the transmission signal transmitted from sensor units 15a to 15d, and performs a monitor process for monitoring tire pressure based on the tire pressure information in the transmission signal. In addition, control unit 11 performs this monitoring process by transmitting, from right front wheel ANT 16a, left front wheel ANT 16b, right rear wheel ANT 16c, left rear wheel ANT 16d through LF transmission unit 12, the transmission request signal that requests transmission of a signal for each of the sensor unit 15a to 15d.

Control unit 11, as described above, transmits the transmission request signal to each of sensor units 15a to 15d, and determines a tire pressure condition of each tire based on the tire pressure information included in the signal transmitted in response to the transmission request signal. In this case, a memory such as ROM in control unit 11 stores threshold information (i.e., a standard pressure) of tire pressure to determine abnormality of each tire. Therefore, the tire pressure in the response signal from each of the sensor units 15a to 15d is compared with the threshold information. While, for example, an ignition switch of vehicle C is turned on, control unit 11 transmits the transmission request signal for each of sensor units 15a to 15d at an interval of several seconds or several minutes.

The antennas are disposed in wheel houses of vehicle C. That is, right front wheel ANT 16a, left front wheel ANT 16b, right rear wheel ANT 16c and left rear wheel ANT 16d are respectively disposed in a right front wheel house, in a left front wheel house, in a right rear wheel house, and in a left rear wheel house, and are connected to control unit 11 through communication lines. In addition, those antennas transmit the transmission request signal to the wireless communication unit of sensor units 15a to 15d. That is, right front wheel ANT 16a transmits the request signal to the wireless communication unit of sensor unit 15a, left front wheel ANT 16b transmits the request signal to the wireless communication unit of sensor unit 15b, right rear wheel ANT 16c transmits the request signal to the wireless communication unit of sensor unit 15c, and left rear wheel ANT 16d transmits the request signal to the wireless communication unit of sensor unit 15d.

The transmission request signal from control unit 11 is transmitted to the wireless communication unit of sensor units 15a to 15d from right front wheel ANT 16a, left front wheel ANT 16b, right rear wheel ANT 16c, and left rear wheel ANT 16d after a modulation process and the like. Further, the signal transmitted from the wireless communication unit of sensor units 15a to 15d and received by UHF reception unit 14 of TPMS is sent to control unit 11 after processes such as amplification, demodulation and the like.

Combination meter 17 is a collection of indicators in an instrument panel of vehicle C such as a speedometer, a tachometer, a water thermometer, a fuel meter. In addition, for example, combination meter 17 displays a determination result of a tire pressure condition of each tire output from control unit 11 on a liquid crystal panel (not illustrated). In addition, for example, combination meter 17 has a warning lamp consisting of LED, and lights the warning lamp for warning the driver if the tire pressure condition determination result indicates tire pressure abnormality.

Bluetooth (abbreviate to BT in the following) communication unit 18 has a BT antenna, and transmits a signal (i.e., information) to handset 2 by the electric wave of 2.4 GHz band according to a communication protocol based on BT communication method, and the signal which has been transmitted from handset 2 by the electric wave of 2.4 GHz band is received by the BT antenna. The signal transmitted from this BT communication unit 18 has a narrower communication area in comparison to the signal transmitted from a UHF transmission and reception unit 23 to be mentioned later, although a communication area of the signal from the BT communication unit 18 has a wider communication area in comparison to the signal transmitted from LF transmission unit 12. In addition, BT communication unit 18 is connected to control unit 11, and outputs information received by the BT antenna to control unit 11 while transmitting information output from control unit 11 by the BT antenna.

In the present embodiment, in-vehicle apparatus 1 is described to have the BT communication unit 18 provided as a single unit. However, the BT communication unit 18 may be provided as a part of a navigation apparatus that is disposed on vehicle C. That is, a BT communication unit in the navigation apparatus may be used as the BT communication unit 18.

Further, control unit 11 performs the collection process and the transmission process for collecting information of the tire pressure of each tire of vehicle C and for transmitting information from BT communication unit 18 to handset 2. The process is designated as a collection-transmission process hereinafter. In the collection-transfer process, the transmission request signal is transmitted to each of sensor units 15a to 15d in turn from right front wheel ANT 16a, left front wheel ANT 16b, right rear wheel ANT 16c, left rear wheel ANT 16d through LF transmission unit 12, and the transmission signal transmitted in response to the transmission request signal from sensor units 15a to 15d is received by UHF reception unit 14 of TPMS, for transmitting the tire pressure information and the ID code in the transmission signal to BT communication unit 18. Then, control unit 11 controls the handset 2 to transmit the tire information from BT communication unit 18. Therefore, control unit 11 and UHF reception unit 14 of TPMS serve as the collection unit in claims. Further, control unit 11, LF transmission unit 12, right front wheel ANT 16a, left front wheel ANT 16b, right rear wheel ANT 16c, and left rear wheel ANT 16d serve as the detection signal transmitter in claims. Furthermore, BT communication unit 18 serves as the detector transmitter in claims.

The above collection process is performed, for example, when the start request signal from the handset 2 in UHF band wave is received by the UHF transmission and reception unit 13 for smart entry and then is input to control unit 11 during an ignition-off time of vehicle C. Further, the above transmission process is performed in succession to the collection process. In this case, during the ignition-off time of vehicle C, each part of in-vehicle apparatus 1 except for UHF transmission and reception unit 13 of the entry system is in a sleep mode, and UHF transmission and reception unit 13 of the entry system is in an active mode by the spare power supplies or the like, which always supplies electric power.

In addition, in the sleep mode, each part of in-vehicle apparatus 1 does not have an operation clock signal, thereby stopping the function of each part. In addition, the operation clock signal is supplied from an oscillation circuit, and a change to the sleep mode is carried out by ordering the stop of the supply of the operation clock signal use to this oscillation circuit. In addition, above-mentioned each part consumes less energy in the sleep mode, in comparison to the active mode. In addition, when, for example, the start request signal is input to control unit 11, an interrupt signal is sent to an above-mentioned oscillation circuit and the operation clock signal is resumed from the oscillation circuit, for forcefully changing each part from the sleep mode to the active mode. In addition, in the present embodiment, components that are changed to the active mode according to the start request signal are designated as waiting components, which include, as required for the collection-transmission process, control unit 11, LF transmission unit 12, UHF reception unit 14 of TPMS, sensor units 15a to 15d, right front wheel ANT 16a, left front wheel ANT 16b, right rear wheel ANT 16c, left rear wheel ANT 16d and BT communication unit 18, except for UHF transmission and reception unit 13 of the entry system which are already in the active mode, among each of the parts of in-vehicle apparatus 1. In addition, control unit 11, LF transmission unit 12, UHF transmission and reception unit 13 of the entry system, UHF reception unit 14 of TPMS, sensor units 15a to 15d, right front wheel ANT 16a, left front wheel ANT 16b, right rear wheel ANT 16c, left rear wheel ANT 16d and BT communication unit 18 required for the collection-transmission process serve as the pressure detector in claims.

Figure 2:
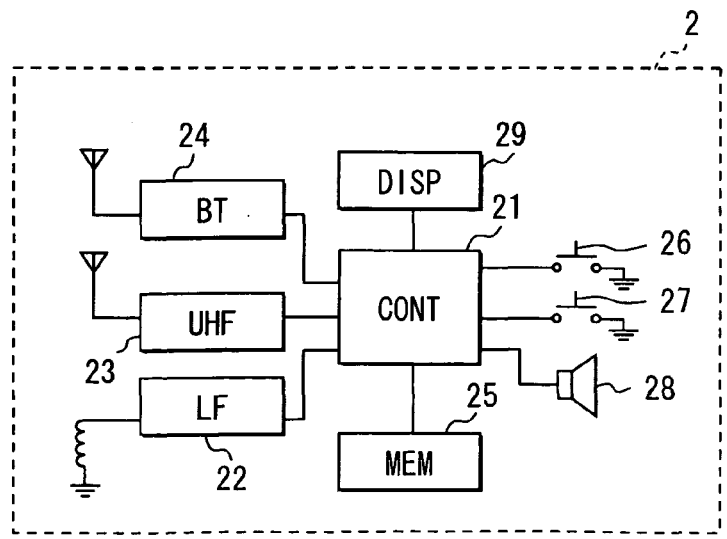
FIG. 2 is a block diagram showing schematic configuration of a handset in the first embodiment.

FIG. 2 is a block diagram showing schematic configuration of handset 2. Handset 2 includes control unit 21, LF reception unit 22, UHF transmission and reception unit 23, BT communication unit 24, memory unit 25, push switches 26, 27, speaker 28 and display 29 as shown in FIG. 2.

Control unit 21 is constituted mainly of a well-known microcomputer which has CPU, ROM, RAM, input/output and the like (not illustrated), and control unit 21 carries out various processes by executing various control programs memorized the ROM. For example, control unit 21 carries out processes about the above-mentioned smart entry function and remote keyless entry function.

LF reception unit 22 has an LF antenna, and the signal (i.e., information) of the LF band which has been transmitted from in-vehicle apparatus 1 is received through this LF antenna. In addition, LF reception unit is connected to control unit 21, and LF reception unit 22 outputs a signal received with the LF antenna to control unit 21.

UHF transmission and reception unit 23 having a UHF antenna transmits a signal (i.e., information) to in-vehicle apparatus 1 by the electric wave of UHF band through this UHF antenna, and a signal (i.e., information) which has been transmitted by the electric wave of UHF band from in-vehicle apparatus 1 is received through this UHF antenna. In addition, UHF transmission and reception unit 23 outputs information received with this UHF antenna to control unit 21 while it is connected to control unit 21, and information output from this control unit 21 is transmitted from a UHF antenna.

BT communication unit 24 having a BT antenna transmits a signal (i.e., information) to in-vehicle apparatus 1 by the electric wave of 2.4 GHz band according to communication protocol based on a BT method through this BT antenna, and the signal which has been transmitted from in-vehicle apparatus 1 by the electric wave of 2.4 GHz band is received through a BT antenna. As for the signal transmitted from this BT communication unit 24, a communication area is not as wide as a communication of the signal transmitted from UHF transmission and reception unit 23. In addition, BT communication unit 24 connected to control unit 21 outputs information received with this BT antenna to control unit 21, and information output from control unit 21 is transmitted from the BT antenna. Specifically, in BT communication unit 24, tire information is acquired by receiving tire information transmitted from BT communication unit 18 of in-vehicle apparatus 1. Therefore, BT communication unit 24 serves as the receiver unit in claims.

Memory unit 25 consists of a rewritable memory which can store contents in a rewritable manner electrically, and various information is memorized therein. Memory unit 25 stores the tire information that is received by control unit 21 received from BT communication unit 24.

Push switches 26, 27 are mainly used to operate a remote keyless entry function. When push switch 26 is pushed once, the vehicle doors are locked, and when push switch 27 is pushed once, the vehicle doors are unlocked.

Speaker 28 is connected to control unit 21, and outputs warning sound determined beforehand. In addition, display 29 displays a text and an image, and uses, for example, a full color display unit such as a liquid crystal display device or the like. In addition, display 29, according to instructions from control unit 21, displays tire pressure information of a specific tire or all tires based on information stored in memory unit 25. Therefore, display 29 serves as the display unit in claims.

A smart entry function based on code comparison through wireless communication between in-vehicle apparatus 1 and handset 2 is described. The smart entry function is used to lock and unlock the vehicle doors. Details of the smart entry function regarding processes in in-vehicle apparatus 1 and handset 2 are configured in the same manner as patent documents such as JP-A-2008-163633 and JP-A-2008-213514, for example.

Each part of in-vehicle apparatus 1 is controlled by control unit 11, and periodically transmits, from LF transmission unit 12, a so-called request signal that requests a transmission of a response signal. In addition, LF reception unit 22 receives the request signal when each part of handset 2 is controlled by control unit 21 when handset 2 enters a wireless communication area of LF transmission unit 12.

In addition, between LF transmission unit 12 and LF reception unit 22, the wireless communication that used the electric wave of the LF band is performed. The electric wave of the LF band is used to limit the transmission and reception of the request signal between in-vehicle apparatus 1 and handset 2 within a small communication area around vehicle C. Specifically, the communication area can be limited around the vehicle door, in the inside of the vehicle, and around the outside of the back door by transmitting the signal from a door antenna, an indoor antenna and an antenna at the back door. In this manner, possibility of receiving the request signal from in-vehicle apparatus 1 in another vehicle can be reduced.

When LF reception unit 22 receives the request signal from in-vehicle apparatus 1, UHF transmission and reception unit 23 transmits the response signal including a code which is peculiar to vehicle C corresponding to handset 2. Then, in-vehicle apparatus 1 receives the response signal which has been transmitted from handset 2 with UHF transmission and reception unit 13 of the entry system.

Between UHF transmission and reception unit 13 of the entry system and UHF transmission and reception unit 23, UHF band wave is used for performing wireless communication. The reason for using the UHF band wave for transmission and reception of the above-mentioned response signal is that, even when the output level of the signal from handset 2 is weak, a certain communication distance can be secured, thereby enabling a secure transmission of the response signal to in-vehicle apparatus 1.

When UHF transmission and reception unit 13 of the entry system receives the response signal which has been transmitted from handset 2, control unit 11 of in-vehicle apparatus 1 performs comparison whether or not a code included in this response signal agrees with a code memorized in control unit 11. If both codes agree, unlocking the door of the vehicle is permitted.

After the unlocking of the vehicle door, a well-known control process in this kind of vehicle system is carried out. For example, in an unlocking permission condition described above, if a touch of a person is detected by the touch sensor on a door knob (not illustrated) on an outside of the vehicle based on a signal from the sensor, control unit 11 outputs an unlocking signal to a door control system, and the door lock motor is driven to unlock all doors in the vehicle. Further, many additional controls such as allowance of engine start and the like may be performed in addition to the unlocking. However, details of the additional controls are omitted as not directly relevant to the essence of the present disclosure.

Figure 3:
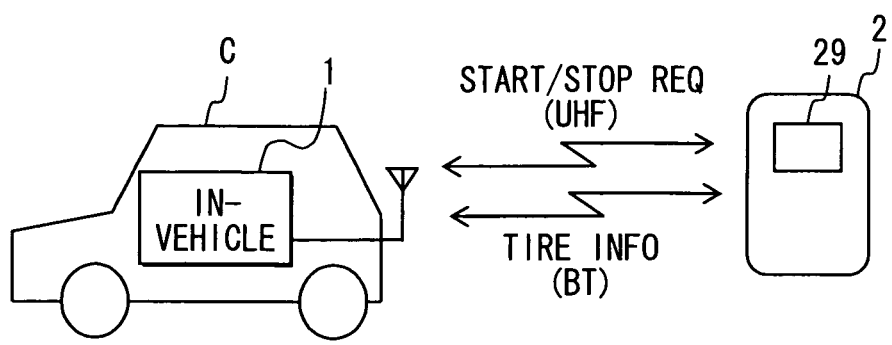
FIG. 3 is a schematic diagram showing information flow in a vehicle system in the first embodiment.

The tire pressure information transmission process is now explained with reference to FIGS. 3 to 6. This process transmits, based on a request from handset 2, the pressure information from in-vehicle apparatus 1 to handset 2. FIG. 3 is a schematic diagram showing information flow in vehicle system 100. As shown in FIG. 3, the communication regarding the start and stop of vehicle system 100 is performed through the UHF band wave between handset 2 and in-vehicle apparatus 1, and the communication regarding the acquisition of tire pressure information from each tire of the vehicle C is performed through the electric wave of 2.4 GHz band based on the BT method.

Figure 4:
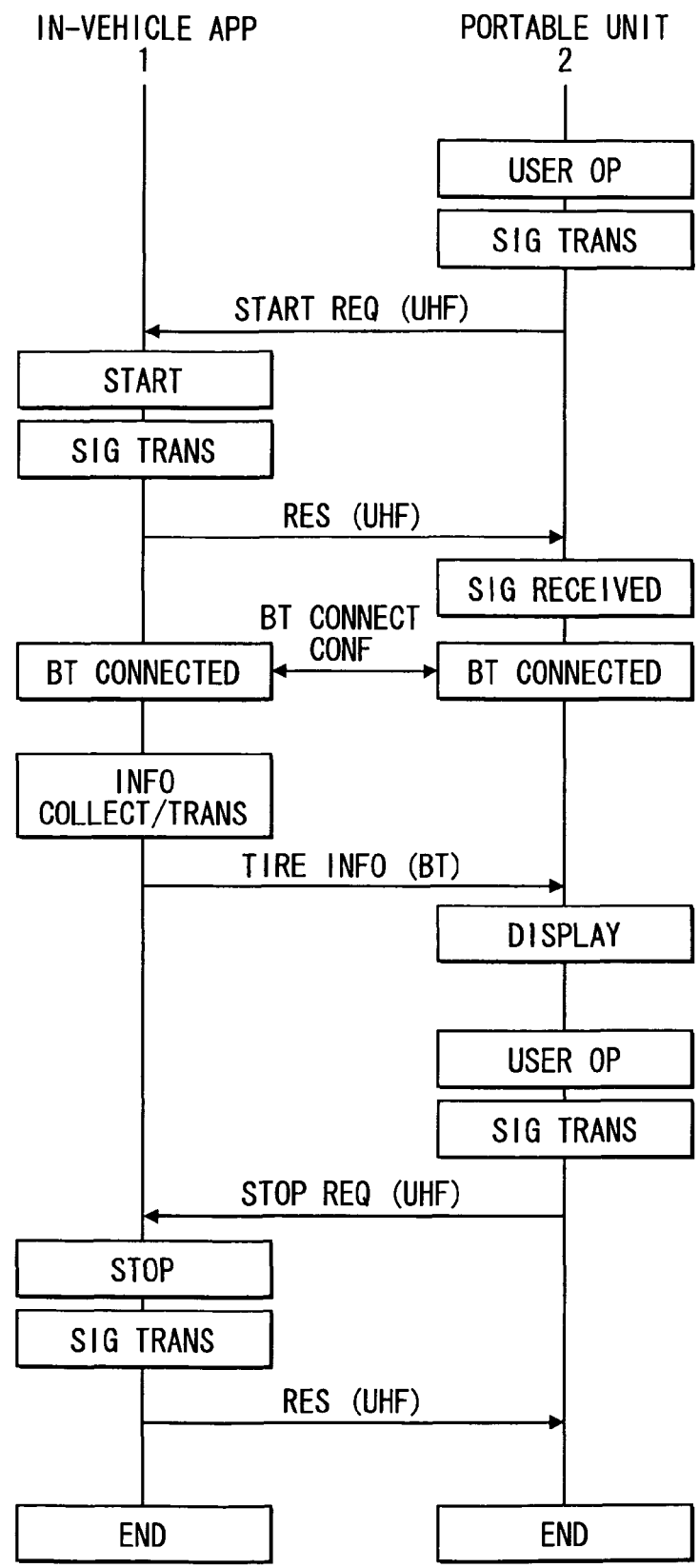
FIG. 4 is a sequence diagram showing information flow between the in-vehicle apparatus of the vehicle system and the handset in the first embodiment.

FIG. 4 is a sequence diagram showing information flow between in-vehicle apparatus 1 in vehicle system 100 and handset 2. In this case, in-vehicle apparatus 1 and handset 2 are assumed to be in a communicable area through both of the UHF band wave communication and the BT communication in terms of communication therebetween.

At first, control unit 21 of handset 2 transmits a start request signal from UHF transmission and reception unit 23 of handset 2 to in-vehicle apparatus 1 by the electric wave of UHF band, for switching the above-mentioned waiting components to the active mode, when a tire pressure acquisition operation is accepted by handset 2. Thus, UHF transmission and reception unit 23 serves as the transmission unit in claims.

The above-described tire pressure acquisition operation may be a two-second continuous-push operation of both of the two switches 26, 27 at the same time on handset 2, or other operations such as an operation of one of the two switches 26, 27, or an operation of a dedicated switch for tire pressure information acquisition on handset 2.

Then, UHF transmission and reception unit 13 of the entry system of in-vehicle apparatus 1 in waiting for the signal reception in the electric wave of UHF band receives the start request signal, and inputs the received signal into control unit 11 of in-vehicle apparatus 1, thereby switching the waiting components to the active mode from the sleep mode. Then, the response signal showing that the waiting components switched to the active mode from the sleep mode according to instructions from control unit 11 is transmitted to handset 2 from UHF transmission and reception unit 13 of the entry system by the electric wave of UHF band.

Then, control unit 21 of handset 2 tries BT connection between BT communication unit 24 of handset 2 and BT communication unit 18 of in-vehicle apparatus 1 after receiving the response signal which has been transmitted from UHF transmission and reception unit 13 of the entry system of in-vehicle apparatus 1 by UHF transmission and reception unit 23 of handset 2. Then, control unit 11 of in-vehicle apparatus 1 performs the collection-transmission process after BT communication is established and confirmed between BT communication unit 24 and BT communication unit 18, for transmitting tire information collected in the collection process from BT communication unit 18 to handset 2 by the electric wave of 2.4 GHz band according to the communication protocol of the BT method.

After receiving the tire information that has been transmitted from BT communication unit 18 of in-vehicle apparatus 1 by BT communication unit 24 of handset 2, the tire pressure information of each tire may be displayed on display 29 for example, based on the tire information, according to the instructions from control unit 21. The tire pressure information displayed on display 29 may be associated with each tire according to the tire ID in the tire information, for example.

Then, control unit 21 of handset 2 transmits the stop request signal that switches the above-mentioned waiting components back to the sleep mode from UHF transmission and reception unit 23 of handset 2 to in-vehicle apparatus 1 by the electric wave of UHF band, when a tire pressure acquisition stop operation transmitted from in-vehicle apparatus 1 is received by handset 2. In this case, the tire pressure acquisition stop operation may be performed in the same manner as the tire pressure acquisition operation.

Then, UHF transmission and reception unit 13 of the entry system of in-vehicle apparatus 1 receives the stop request signal, and inputs the signal into control unit 11 of in-vehicle apparatus 1, thereby switching the waiting components to the sleep mode from the active mode and stopping the collection-transmission process. The active mode to sleep mode switching may be performed by stopping provision of the operation clock signal to the waiting components by instructions of control unit 11. Then, the response signal showing that the waiting components are switched from the active mode to the sleep mode is transmitted from UHF transmission and reception unit 13 of the entry system to handset 2 according to instructions from control unit 11 by the electric wave of UHF band, and the process in in-vehicle apparatus 1 is concluded. On the other hand, the process in handset 2 is concluded after receiving, by UHF transmission and reception unit 23 of handset 2, the response signal which has been transmitted from UHF transmission and reception unit 13 of the entry system of in-vehicle apparatus 1.

Figure 5:
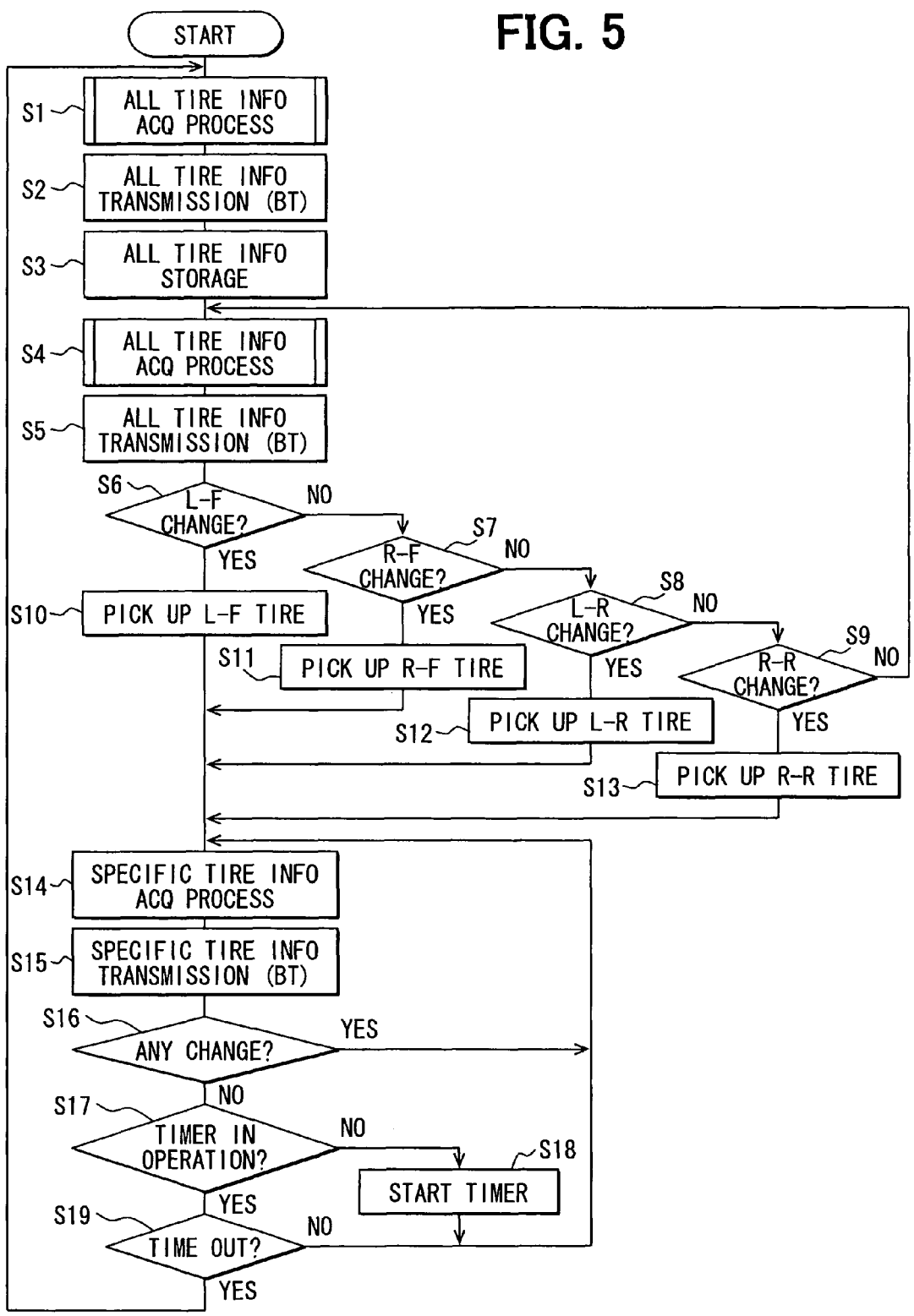
FIG. 5 is a flow diagram showing a collection-transmission process by a control unit of the in-vehicle apparatus in the first embodiment.

The collection-transmission process in control unit 11 of in-vehicle apparatus 1 is explained with reference to FIG. 5. FIG. 5 is a flow diagram showing the collection-transmission process by control unit 11 of the in-vehicle apparatus 1. This flow is started when, for example, BT communication between BT communication unit 18 of in-vehicle apparatus 1 and BT communication unit 24 of handset 2 is established.

Figure 6:
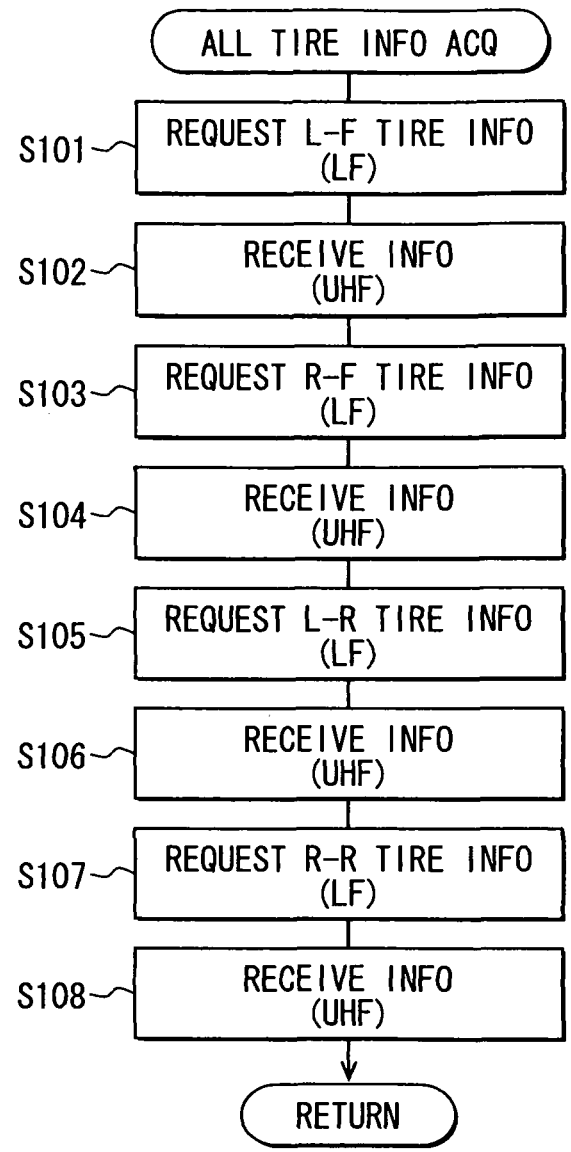
FIG. 6 is a flow diagram showing an all tire information acquisition process in the first embodiment.

At first, at step S1, an all tire information acquisition process is performed, and step S2 follows. Now, with reference to FIG. 6, an outline of the all tire information acquisition process is explained. FIG. 6 is a flow diagram showing the all tire information acquisition process.

In the all tire information acquisition process, a transmission request signal is output through left front ANT 16b from LF transmission unit 12 to sensor unit 15b under control of control unit 11 by the electric wave of LF band (the request is designated as a left-front (L-F) tire information request hereinafter) at step S101. Then, at step S102, in response to the above request, the transmission signal including tire pressure information of the left-front tire (i.e., the tire information)

from sensor unit 15b is received by UHF reception unit 14 of TPMS by the electric wave of UHF band.

Then, at step S103, a transmission request signal is output through right front ANT 16a from LF transmission unit 12 to sensor unit 15a under control of control unit 11 by the electric wave of LF band (the request is designated as a right-front (R-F) tire information request hereinafter). Then, at step S104, in response to the above request, the transmission signal including tire pressure information of the right-front tire (i.e., the tire information) from sensor unit 15a is received by UHF reception unit 14 of TPMS by the electric wave of UHF band.

Then, at step S105, a transmission request signal is output through left rear ANT 16d from LF transmission unit 12 to sensor unit 15d under control of control unit 11 by the electric wave of LF band (the request is designated as a left-rear (L-R) tire information request hereinafter). Then, at step S106, in response to the above request, the transmission signal including tire pressure information of the left-rear tire (i.e., the tire information) from sensor unit 15d is received by UHF reception unit 14 of TPMS by the electric wave of UHF band.

Then, at step S107, a transmission request signal is output through right rear ANT 16c from LF transmission unit 12 to sensor unit 15c under control of control unit 11 by the electric wave of LF band (the request is designated as a right-rear (R-R) tire information request hereinafter). Then, at step S108, in response to the above request, the transmission signal including tire pressure information of the right-rear tire (i.e., the tire information) from sensor unit 15c is received by UHF reception unit 14 of TPMS by the electric wave of UHF band.

Now coming back to step S2 of FIG. 5, all tire information about each of the four tires, that is, a left-front tire, a right-front tire, a left-rear tire, and a right-rear tire, is transmitted from BT communication unit 18 to handset 2 by BT communication. Then, at step S3, all tire information is stored temporarily in, for example, a memory of control unit 11 such as RAM or the like. In this case, the information in the memory of control unit 11 is erased when, for example, new tire information is overwritten.

At step S4, the all tire information acquisition process is performed, and step S5 follows. The process at S4 is also performed according to steps S101 to S108 of FIG. 6. Then, at step S105, all tire information is transmitted to handset 2 by BT communication from BT communication unit 18.

Then, at step S6, whether there is a change of the tire pressure in the left-front tire is determined. The tire pressure change is determined based on the comparison between (a) a certain threshold and (b) the difference of the left-front tire pressure temporarily stored at S3 and the left-front tire pressure acquired at S4. If the tire pressure of the left-front tire is determined to be changing, corresponding YES at S6, the process proceeds to step S10. If the tire pressure is determined not to be changing, corresponding NO at S6, the process proceeds to step S7.

At step S7, whether there is a change of the tire pressure in the right-front tire is determined. The tire pressure change is determined based on the comparison between (a) a threshold and (b) the difference of the right-front tire pressure temporarily stored at S3 and the right-front tire pressure acquired at S4. If the tire pressure of the right-front tire is determined to be changing, corresponding YES at S7, the process proceeds to step S11. If the tire pressure is determined not to be changing, corresponding NO at S7, the process proceeds to step S8.

At step S8, whether there is a change of the tire pressure in the left-rear tire is determined. The tire pressure change is determined based on the comparison between a threshold and the difference of the left-rear tire pressure temporarily stored at S3 and the left-rear tire pressure acquired at S4. If the tire pressure of the left-rear tire is determined to be changing, corresponding YES at S8, the process proceeds to step S12. If the tire pressure is determined not to be changing, corresponding NO at S8, the process proceeds to step S9.

At step S9, whether there is a change of the tire pressure in the right-rear tire is determined. The tire pressure change is determined based on the comparison between a threshold and the difference of the right-rear tire pressure, temporarily stored at S3 and the right-rear tire pressure acquired at S4. If the tire pressure of the right-rear tire is determined to be changing, corresponding YES at S9, the process proceeds to step S13. If the tire pressure is determined not to be changing, corresponding NO at S9, the process returns to step S4 to repeat the process from S4.

In other words, the process from S6 to S9 determines whether there is any sensor unit, among sensor units 15a to 15d, that detects an above-the-threshold change of the currently detected tire pressure, based on the current reading of pressure sensors in the sensor units. Therefore, control unit 11 serves as the first determination unit in claims. In addition, the threshold in S6 to S9 is a value that, for example, is sufficiently greater than the detection error range of the pressure sensor, and the value is set arbitrarily.

At step S10, the left-front tire is determined as a specific tire that is currently in a pressure adjustment process. Likewise, at step S11, the right-front tire is determined as a specific tire that is currently in a pressure adjustment process, and at step S12, the left-rear tire is determined as a specific tire that is currently in a pressure adjustment process, and at step S13, the right-rear tire is determined as a specific tire that is currently in a pressure adjustment process. After each of S10 to S13, the process proceeds to step S14.

At step S14, a specific tire information acquisition process is performed, and step S15 follows. In the specific tire information acquisition process, a transmission signal including the information of the tire pressure of the specific tire is received by transmitting a request signal to the sensor unit of the specific tire. Then, at step S15, the tire information of the specific tire is transmitted from BT communication unit 18 to handset 2 by BT communication, and step S16 follows.

In this case, control unit 21 of handset 2 may be configured to display the tire pressure information of the specific tire only, when the tire information of the specific tire is transmitted from BT communication unit 18 to BT communication unit 24 of handset 2 by BT communication. In this manner, only the tire pressure information of the tire(s) currently in the pressure adjustment process is displayed for the user, thereby facilitating the tire pressure adjustment performed by the user. That is, in other words, the tire pressure adjustment result can be promptly confirmed right after the pressure adjustment of the specific tire.

At step S16, whether there is a change of the tire pressure in the specific tire is determined, based on a comparison between a certain threshold and the difference of the tire pressure information of the specific tire from the all tire pressure information acquired at S4 and the tire pressure information of the specific tire acquired at S14. The threshold used in this comparison is substantially the same as the one in S6, S7, S8, or S9. If the tire pressure is determined to be changing, corresponding to YES at S16, the process returns to S14. If the tire pressure is determined not to be changing, corresponding to NO at S16, the process proceeds to S17. At S16, in case that returning from S16 to S14 has been previously performed, the pressure comparison at S14 is performed as the comparison between the previously acquired tire pressure information performed previously at S14 and the tire pressure information now acquired at S14. In other words, two pieces of the tire pressure information acquired at S14 at an interval is compared with each other in that case.

Then, whether a timer (not illustrated) is in operation is determined at step S17. If the timer is determined to be in operation, corresponding YES at S17, the process proceeds to step S19. If the timer is determined not to be in operation, corresponding NO at S17, the process proceeds to step S18. At S18, the timer is started, and the process returns to S14 to repeat the flow from S14.

At step S19, it is determined whether the timecount of the timer exceeds a threshold time (in other words, time-out). If the time count exceeds the threshold time, corresponding to YES at S19, the process returns to S1 to repeat the flow from S1. If the time count has not yet exceeded the threshold time, corresponding to NO at S19, the process returns to S14 to repeat the flow from S14. Therefore, control unit 11 serves as the second determination unit in claims.

The advantages of the above operation scheme of the present embodiment are summarized as follows. That is, from among all pats in in-vehicle apparatus 1, only a required part is forcefully operated by an instruction from handset 2 that is carried by the user for detecting and wirelessly transmitting tire pressure of the vehicle C to be displayed on display 29 of handset 2. In other words, the user can acquire tire pressure information at hand on demand. Therefore, vehicle system 100 saves the user from getting into the vehicle C, turning on the ignition switch and peeking into the meter panel only to check the tire pressure. To put it differently, vehicle system 100 saves all the hassles of the user such as purchasing an air-gauge and picking up pressure values of all four tires by him/herself circling around the vehicle C.

Further, the user standing at the specific tire that requires the pressure adjustment can promptly check the tire pressured by using display 29 of handset 2 after the pressure adjustment, without getting into and out of the vehicle C. In other words, the pressure adjustment process is greatly simplified and is made easy, thereby improving the user's convenience. That is, the tire pressure can be checked whenever the user thinks of checking it.

Further, when the tire pressure of a certain tire of the vehicle C is changing, the certain tire may be, or highly possibly be, in the pressure adjustment process. In that case, only the pressure change of that certain tire can be promptly picked up and tire pressure information is collected only from that certain tire by transmitting instruction only to the sensor unit of that tire. Therefore, transmitting an instruction for tire pressure detection to other tires can be saved, thereby reducing useless battery consumption due to the tire pressure detection. Furthermore, transmitting tire pressure information only from the tire in the pressure adjustment process can reduce the process time for processing tire pressure information from other tires (i.e., other sensor units), thereby decreasing the turn-around time (i.e., a lead time) between pressure detection by the sensor unit and information transmission by BT communication unit 18 toward BT communication unit 24 of handset 2.

In the above embodiment, handset 2 acquires the information of the tire pressure of vehicle C detected by the air pressure sensor of sensor units 15a to 15d of in-vehicle apparatus 1, and displays the acquired tire pressure information on display 29 of handset 2. However, for example, once handset 2 acquires the tire pressure information from the pressure sensor of sensor units 15a to 15d of in-vehicle apparatus 1, a communication terminal may acquire the tire pressure information from handset 2 and may display the tire pressure information on a display unit on the terminal. An example of such a configuration is described as vehicle system 200 with reference to FIGS. 7 to 9. In the following description, like parts have like numbers, and only the difference from the above embodiment is described.

Vehicle system 200 includes in-vehicle apparatus 1, handset 2a and cellular phone 3. Handset 2a has same configuration as handset 2 except that handset 2a does not have display 29. In addition, cellular phone 3 is a kind of a mobile communication terminal carried by a user. Therefore, cellular phone 3 serves as the communication terminal in claims. Further, except for the portion described in the following, cellular phone 3 in the present embodiment has well-known configuration, that is, has substantially same configuration as generally-available cellular phones.

Figure 7:
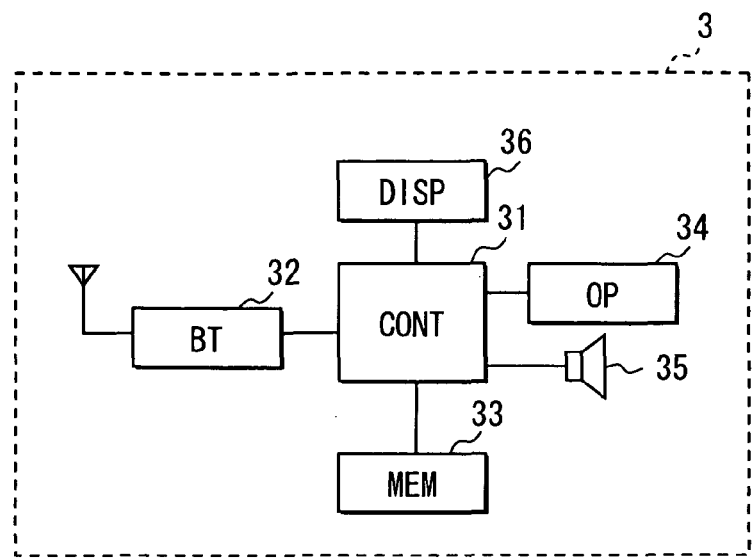
FIG. 7 is a block diagram showing schematic configuration of a cellular phone in a second embodiment.

The schematic configuration of cellular phone 3 is explained in the following. FIG. 7 is a block diagram showing schematic configuration of a cellular phone 3 in a second embodiment. Cellular phone 3 includes control unit 31, BT communication unit 32, memory unit 33, operation input unit 34, speaker 35 and display 36 as shown in FIG. 7.

Control unit 31 has, as a main part, a microcomputer having CPU, ROM, RAM, input/output and the like (not illustrated), and carries out various processes by executing various control programs memorized in ROM.

BT communication unit 32 has a BT antenna, and transmits a signal (i.e., information) to handset 2a by the electric wave of 2.4 GHz band according to communication protocol based on the BT method through the BT antenna, and receives a signal transmitted from handset 2a by the electric wave of 2.4 GHz band by the BT antenna. In addition, BT communication unit 32 outputs information received by the BT antenna to control unit 31 while it is connected to control unit 31, and transmits information from this control unit 31 by the BT antenna. Specifically, BT communication unit 32 acquires tire information by receiving tire information transmitted from BT communication unit 24 of handset 2a. Therefore, BT communication unit 32 serves as a first terminal receiver in claims.

Memory unit 33 consists of a memory which can rewrite its contents electrically, and memorizes various kinds of information. Memory unit 33 stores the tire information that control unit 31 received from BT communication unit 32.

Operation input unit 34 is, for example, provided as a touch switch or a mechanical switch that is integrally formed with control unit 31. Operation of the switch on the operation input unit 34 enables the user to input various operation instructions to control unit 31. Speaker 35 is connected to control unit 31, and outputs a vocal sound, a buzzer sound and the like. Display 36 displays a text and an image, and, for example, is implemented as a full color image display such as a liquid crystal display. Display 36, under control and instructions of control unit 31, displays the tire pressure information of each tire and/or the specific tire based on stored tire information in memory unit 33. Therefore, display 36 serves as the terminal display in claims.

Figure 8:
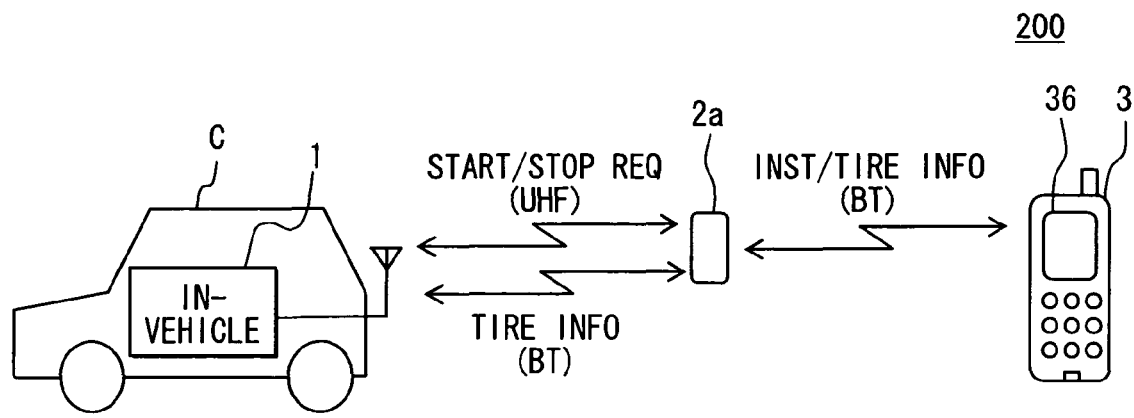
FIG. 8 is a schematic diagram showing information flow in the vehicle system in the second embodiment.
Figure 9:
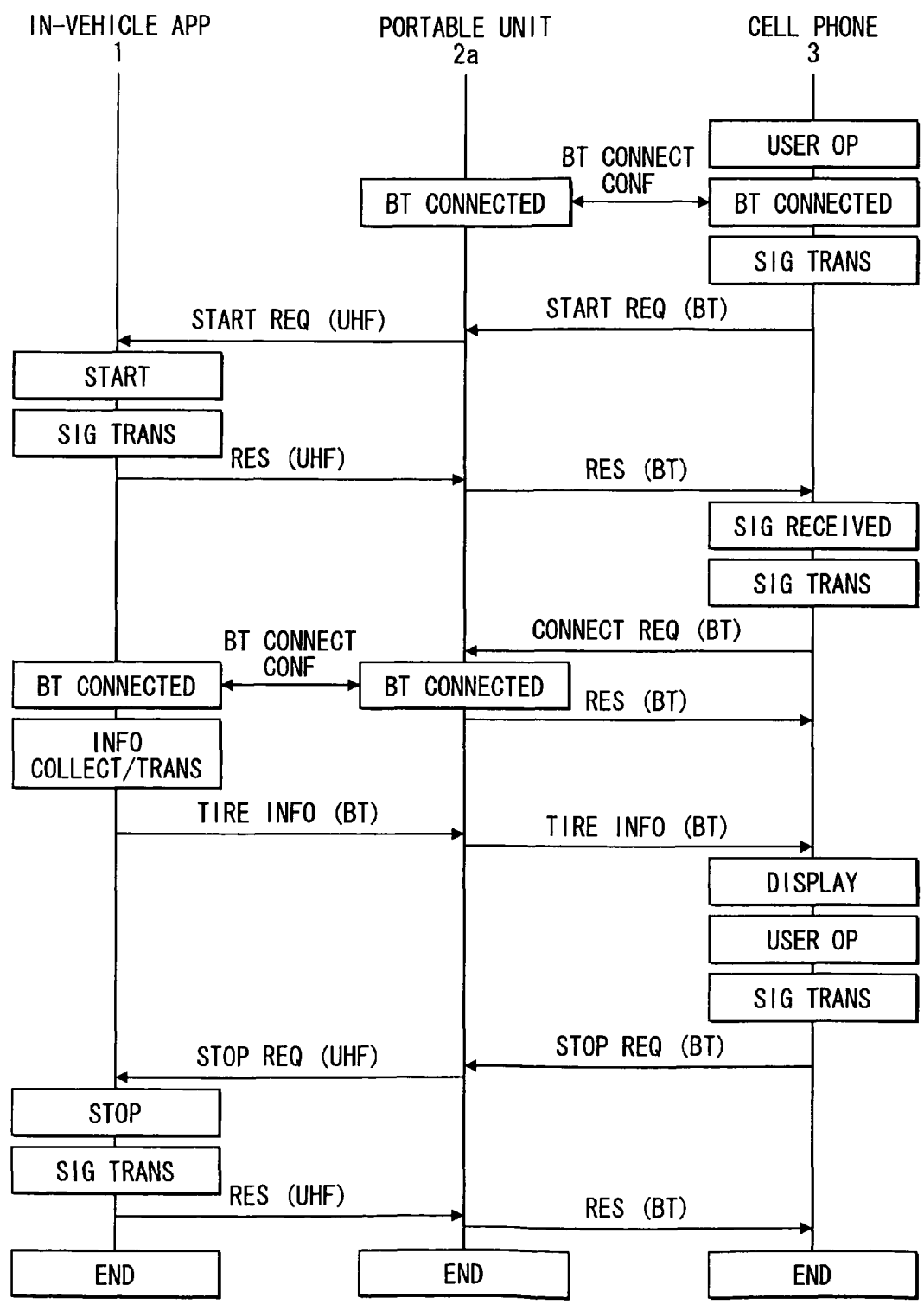
FIG. 9 is a sequence diagram showing information flow between the in-vehicle apparatus of the vehicle system, the handset and the cellular phone in the second embodiment.

With reference to FIGS. 8 and 9, transmission of information of the air pressure of each tire of vehicle C to cellular phone 3 through handset 2a from in-vehicle apparatus 1 is described. The transmission process is performed based on a request from cellular phone 3 through handset 2a. As shown in FIG. 8, a schematic view showing information flow in vehicle system 200 is illustrated. The communication concerned with a start/stop request of in-vehicle apparatus 1 is performed by using the electric wave of UHF band between handset 2a and in-vehicle apparatus 1, and the communication concerned with the acquisition of the information of the air pressure from each tire of vehicle C is performed by the communication protocol of BT method, by using the electric wave of 2.4 GHz band. Further, the communication concerned with control instructions to handset 2a and the acquisition of the information of the air pressure of each tire of vehicle C is performed by the communication protocol of BT method, by using the electric wave of 2.4 GHz band between cellular phone 3 and handset 2a.

Details of the information flow between cellular phone 3, handset 2a, and in-vehicle apparatus 1 in vehicle system 200 are explained next with reference to FIG. 9. In FIG. 9, one example of information flow sequence between in-vehicle apparatus 1 in vehicle system 200, handset 2a and cellular phone 3 is shown. In this case, in-vehicle apparatus 1 and handset 2a are assumed to be in a communicable area through both of the UHF band wave communication and the BT communication in terms of communication therebetween. Also, handset 2a and cellular phone 3 are assumed to be in a communicable area through the BT communication in terms of communication therebetween.

At first, control unit 31 of cellular phone 3 tries BT connection between BT communication unit 32 of cellular phone 3 and BT communication unit 24 of handset 2a, when an operation input instructing a start of the acquisition of the information of the tire pressure of each tire of vehicle C from in-vehicle apparatus 1 is received by operation input unit 34 of cellular phone 3. Then, according to the communication protocol based on BT method, control unit 31 of cellular phone 3 transmits the start request signal to handset 2a by the electric wave of 2.4 GHz band from BT communication unit 32 of cellular phone 3 after BT communication is established between BT communication unit 32 and BT communication unit 24.

Control unit 21 of handset 2a transmits the start request signal to in-vehicle apparatus 1 by the electric wave of UHF band from UHF transmission and reception unit 23 of handset 2a after receiving the start request signal from BT communication unit 32 of cellular phone 3 by using BT communication unit 24 of handset 2a.

Then, the waiting components are switched from the sleep mode to the active mode, when UHF transmission and reception unit 13 of the entry system of in-vehicle apparatus 1 waiting for the reception of the signal which has been transmitted by the electric wave of UHF band receives the start request signal and inputs the received signal into control unit 11 of in-vehicle apparatus 1. Then, according to instructions from control unit 11, a response signal showing that the waiting components are switched from the sleep mode to the active mode is transmitted from UHF transmission and reception unit 13 of the entry system to handset 2a by the electric wave of UHF band.

Then, after receiving the response signal which has been transmitted from UHF transmission and reception unit 13 of the entry system of in-vehicle apparatus 1 to UHF transmission and reception unit 23 of handset 2a, control unit 21 of handset 2a transmits this response signal to cellular phone 3 by the electric wave of 2.4 GHz band from BT communication unit 24 of handset 2a successively according to communication protocol based on BT method.

Then, according to the communication protocol based on BT method, control unit 31 of cellular phone 3 transmits to handset 2a a connection request signal requesting BT connection between BT communication unit 24 of handset 2a and BT communication unit 18 of in-vehicle apparatus 1 by the electric wave of 2.4 GHz band after receiving the response signal which has been transmitted from BT communication unit 24 of handset 2a to BT communication unit 32 of cellular phone 3.

Control unit 21 of handset 2a tries BT connection between BT communication unit 24 and BT communication unit 18 of in-vehicle apparatus 1 after receiving the connection request signal which has been transmitted from BT communication unit 32 of cellular phone 3 to BT communication unit 24 of handset 2a. Then, after establishing BT connection between BT communication unit 24 and BT communication unit 18, a response signal showing the establishment of BT communication between BT communication unit 24 and BT communication unit 18 is transmitted from BT communication unit 24 to cellular phone 3 by the electric wave of 2.4 GHz band according to instructions from control unit 21 through the communication protocol based on BT method.

Further, after receiving, by BT communication unit 32, the response signal which has been transmitted from BT communication unit 24 of handset 2a showing that BT connection between. BT communication unit 24 of handset 2a and BT communication unit 18 is established, control unit 31 of cellular phone 3 controls BT communication unit 32 to wait for the signal which is to be transmitted by the electric wave of 2.4 GHz band according to the communication protocol based on BT method to BT communication unit 32 of cellular phone 3.

Further, control unit 11 of in-vehicle apparatus 1 performs the collection-transmission process after BT communication is established between BT communication unit 24 of handset 2a and BT communication unit 18 of in-vehicle apparatus 1, and transmits tire information collected by the collection process to handset 2a by the electric wave of 2.4 GHz band from BT communication unit 18 according to the communication protocol based on BT method.

Then, control unit 21 transmits the tire information to cellular phone 3 by the electric wave of 2.4 GHz band from BT communication unit 24 according to the communication protocol based on BT method, after receiving the tire information that has been transmitted from BT communication unit 18 of in-vehicle apparatus 1 to BT communication unit 24 of handset 2a. Therefore, control unit 21 and BT communication unit 24 serve as the mediation unit in claims.

Then, according to instructions from control unit 31, after receiving the tire information by BT communication unit 32 of cellular phone 3 which has been waiting for the transmission of the signal, the information of the tire pressure of each tire is displayed on display 36, for example, based on the received tire information. When the tire pressure information is displayed on display 36, control unit 31 may associate each tire with the tire pressure information, based on the ID code included in the tire information.

When an operation input for stopping the acquisition of the information of the tire pressure of each tire of vehicle C is input from operation input unit 34 of cellular phone 3, control unit 31 of cellular phone 3 transmits the stop request signal from BT communication unit 32 of cellular phone 3 to handset 2a by the electric wave of 2.4 GHz band according to the communication protocol based on BT method, in order to switch the waiting components back to the sleep mode.

Further, after receiving the stop request signal which has been transmitted from BT communication unit 32 of cellular phone 3 to BT communication unit 24 of handset 2a, control unit 21 of handset 2a transmits the stop request signal by the electric wave of UHF band from UHF transmission and reception unit 23 of handset 2a to in-vehicle apparatus 1. Then, UHF transmission and reception unit 13 of the entry system of in-vehicle apparatus 1 receives the stop request signal to input the signal to control unit 11 of in-vehicle apparatus 1, and the waiting components are switched from the active mode to sleep mode, and the collection-transfer process is stopped. Then, according to instructions from control unit 11, a response signal showing that the waiting components are switched from the active mode to the sleep mode is transmitted from UHF transmission and reception unit 13 of the entry system to handset 2a by the electric wave of UHF band, and the process in in-vehicle apparatus 1 is concluded.

On the other hand, control unit 21 of handset 2a transmits the response signal from BT communication unit 24 of handset 2a to cellular phone 3 by the electric wave of 2.4 GHz band, after receiving, by UHF transmission and reception unit 23 of handset 2a, the response signal showing that the waiting components are switched from the active mode to the sleep mode from UHF transmission and reception unit 13 of the entry system of in-vehicle apparatus 1, and the process in handset 2a is concluded. Then, the process in cellular phone 3 is also concluded, after receiving the response signal showing that waiting components are switched from the active mode to the sleep mode by BT communication unit 32 of cellular phone 3 from BT communication unit 24 of handset 2a.

The advantages of the above operation scheme of the present embodiment are summarized as follows. That is, because cellular phone 3 carried by the user acquires the information of tire pressure detected by the pressure sensor of sensor units 15a to 15d through wireless communication, and the cellular phone 3 can display the information of the tire pressure of vehicle C on display 36 by the configuration described above, the information of the tire pressure of vehicle C is readily available for the user. Therefore, the tire pressure can be easily and promptly acquired whenever the user thinks of the adjustment of the tire pressure.

In the above embodiment, handset 2 acquires the information of the tire pressure of vehicle C detected by the air pressure sensors in sensor units 15a to 15d of in-vehicle apparatus 1, and the information acquired by handset 2 is then acquired by cellular phone 3, for displaying the acquired tire pressure information on display 36 of cellular phone 3. However, for example, the information of the tire pressure of vehicle C detected by the air pressure sensors of sensor units 15a to 15d of in-vehicle apparatus 1 may be directly acquired by cellular phone 3, without handset 2. An example of such a configuration is described as vehicle system 300 with reference to FIGS. 10 and 11. In the following description, like parts have like numbers, and only the difference from the above embodiment is described.

Vehicle system 300 includes in-vehicle apparatus 1, handset 2a and cellular phone 3. Vehicle system 300 has similar configuration as vehicle system 200 except that cellular phone 3 acquires the information of the tire pressure of vehicle C detected by sensor units 15a to 15d of in-vehicle apparatus 1 without using handset 2a.

Figure 10:
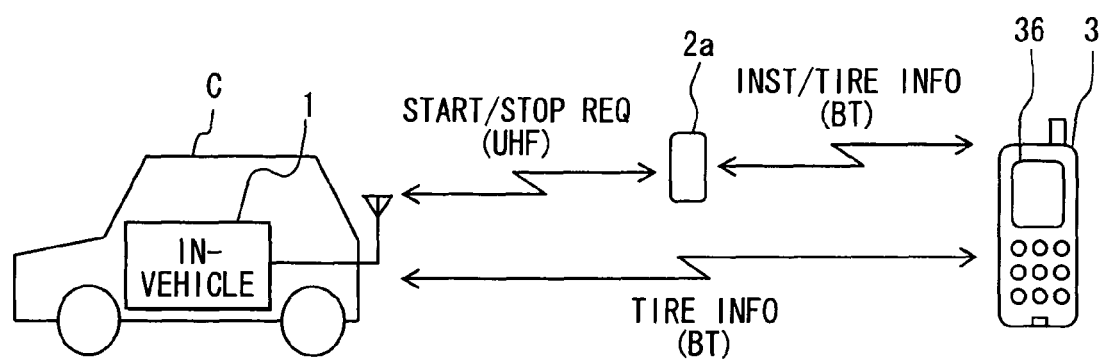
FIG. 10 is a schematic diagram showing information flow in the vehicle system in a third embodiment.
Figure 11:
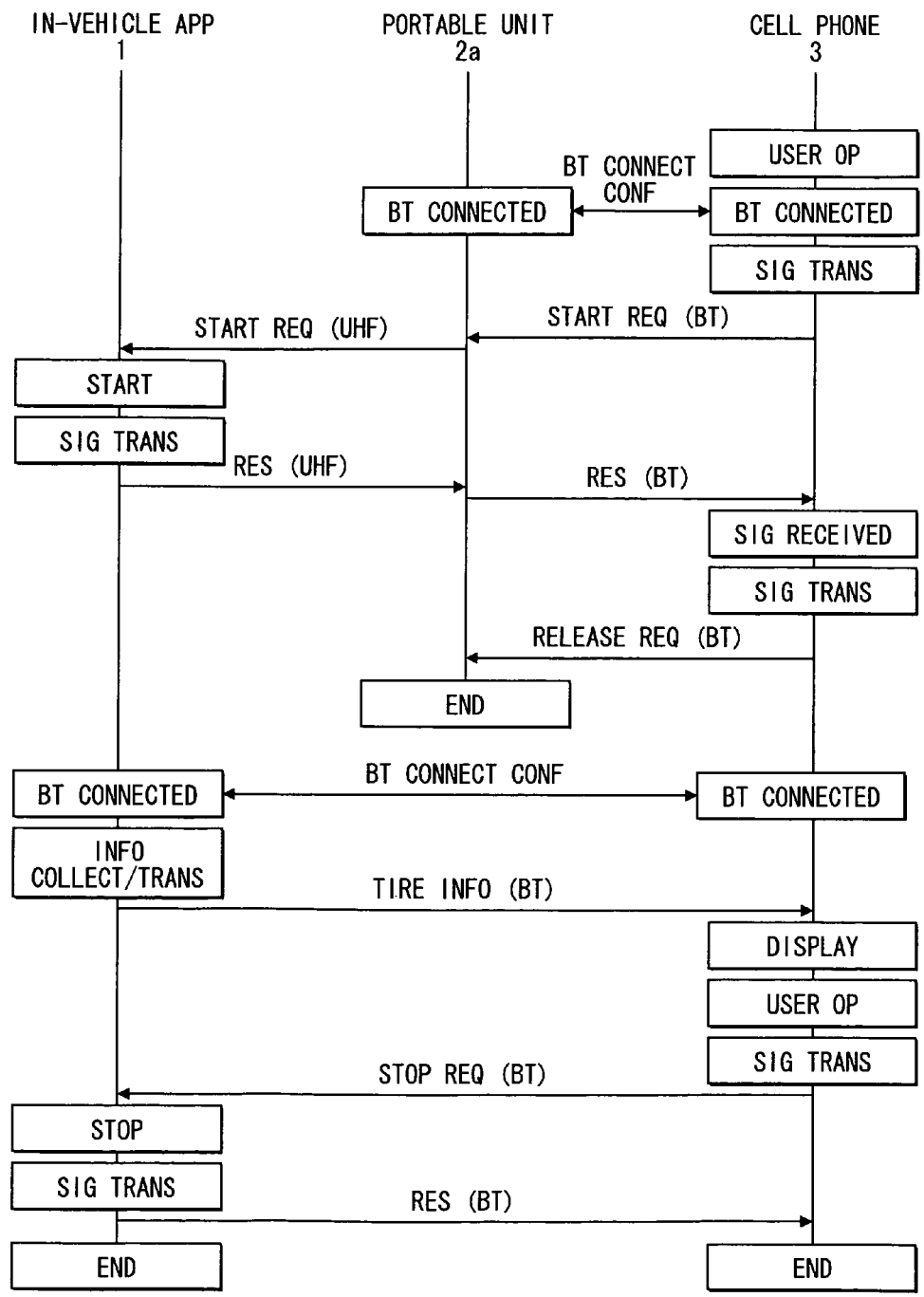
FIG. 11 is a sequence diagram showing information flow between the in-vehicle apparatus of the vehicle system, the handset and the cellular phone in the third embodiment.

With reference to FIGS. 10 and 11, transmission of information of the air pressure of each tire of vehicle C to cellular phone 3 from in-vehicle apparatus 1 is described. The transmission process is performed based on a request from cellular phone 3 through handset 2a. As shown in FIG. 10, a schematic view showing information flow in vehicle system 300 is illustrated. The communication concerned with a start/stop request of in-vehicle apparatus 1 is performed by using the electric wave of UHF band between handset 2a and in-vehicle apparatus 1. The communication concerned with control instructions to handset 2a is performed by the communication protocol of BT method, by using the electric wave of 2.4 GHz band between cellular phone 3 and handset 2a. The communication concerned with the acquisition of the information of the air pressure of each tire of vehicle C is performed by the communication protocol of BT method, by using the electric wave of 2.4 GHz band between cellular phone 3 and in-vehicle apparatus 1.

Details of the information flow between cellular phone 3, handset 2a, and in-vehicle apparatus 1 in vehicle system 300 explained next with reference to FIG. 11. In FIG. 11, one example of information flow sequence between in-vehicle apparatus 1 in vehicle system 300, handset 2a and cellular phone 3 is shown. In this case, in-vehicle apparatus 1 and handset 2a are assumed to be in a communicable area through both of the UHF band wave communication and the BT communication in terms of communication therebetween. Also, handset 2a and cellular phone 3 as well as in-vehicle apparatus 1 and handset 2a are assumed to be in a communicable area through the BT communication in terms of communication therebetween.

In the sequence illustrated in FIG. 11, the same process is performed as the sequence in FIG. 9 for a portion from the start of the sequence to the transmission of the response signal, which indicates the mode switching of the waiting components from the sleep mode to the active mode, from BT communication unit 24 of handset 2a to cellular phone 3 by the electric wave of 2.4 GHz band.

Then, control unit 31 of cellular phone 3 transmits a connection release request signal requesting release of the communication connection between UHF transmission and reception unit 13 of the entry system of in-vehicle apparatus 1 and UHF transmission and reception unit 23 of handset 2a by the electric wave of 2.4 GHz band according to the communication protocol based on BT method, after receiving, from BT communication unit 24 of handset 2a by BT communication unit 32 of cellular phone 3, the response signal showing that waiting components are switched from the sleep mode to the active mode.

Then, control unit 21 of handset 2a releases the communication connection between UHF transmission and reception unit 13 of the entry system of in-vehicle apparatus 1 and UHF transmission and reception unit 23 of handset 2a after receiving the connection release request signal which has been transmitted from BT communication unit 32 of cellular phone 3 to BT communication unit 24 of handset 2a.

In addition, control unit 31 of cellular phone 3 tries BT connection between BT, communication unit 32 and BT communication unit 18 of in-vehicle apparatus 1 after transmitting the connection release request signal to handset 2a from BT communication unit 32 of cellular phone 3. Then, control unit 11 of in-vehicle apparatus 1 performs the collection-transmission process after BT communication is established between BT communication unit 32 and BT communication unit 18, and transmits the tire information collected by the collection process from BT communication unit 18 to handset 2a by the electric wave of 2.4 GHz band according to the communication protocol based on BT method.

Then, after receiving the lire information that has been transmitted from BT communication unit 18 of in-vehicle apparatus 1 to BT communication unit 32 of cellular phone 3, the information of the tire pressure of each tire is displayed on display 36 based on the tire information, according to the instructions of control unit 31. In addition, in BT communication unit 32, the tire information is acquired by receiving tire information transmitted from BT communication unit 18 of in-vehicle apparatus 1. Therefore, BT communication unit 32 serves as the second terminal receiver in claims.

When an operation input for stopping the acquisition of the information of the tire pressure of each tire of vehicle C is input from operation input unit 34 of cellular phone 3, control unit 31 of cellular phone 3 transmits the stop request signal from BT communication unit 32 of cellular phone 3 to in-vehicle apparatus 1 by the electric wave of 2.4 GHz band according to the communication protocol based on BT method, in order to switch the waiting components back to the sleep mode.

Further, after (a) receiving the stop request signal which has been transmitted from BT communication unit 32 of cellular phone 3 to BT communication unit 18 of in-vehicle apparatus 1, and (b) inputting the stop request signal to control unit 11 of in-vehicle apparatus 1, and (c) switching the waiting components from the active mode to the sleep mode, the collection-transfer process is stopped. Then, the response signal showing that the waiting components are switched from the active mode to the sleep mode is transmitted from BT communication unit 18 to cellular phone 3 by the electric wave of 2.4 GHz band by the communication protocol based on BT method according to instructions from control unit 11, and the process in in-vehicle apparatus 1 is concluded. On the other hand, after receiving, from BT communication unit 18 of in-vehicle apparatus 1 by BT communication unit 32 of cellular phone 3, the response signal showing that the waiting components are switched from the active mode to the sleep mode, the process in cellular phone 3 is also concluded.

By devising the above-described configuration, the tire pressure can be easily and promptly acquired whenever the user thinks of the adjustment of the tire pressure.

In the above embodiment, after collecting, to control unit 11 of in-vehicle apparatus 1, the information of the tire pressure of vehicle C detected by the pressure sensor of sensor units 15a to 15d of in-vehicle apparatus 1, the information is transmitted from BT communication unit 18 of in-vehicle apparatus 1 to handset 2/2a. However, without collecting the tire pressure information to control unit 11 of in-vehicle apparatus 1, the information may be directly acquired by handset 2b, for example. An example of such a configuration is described as vehicle system 400 with reference to FIGS. 12 to 14. In the following description, like parts have like numbers, and only the difference from the above embodiment is described.

Vehicle system 400 includes in-vehicle apparatus 1 and handset 2b. The handset 2b has similar configuration as handset 2 except that handset 2b has UHF transmission and reception unit 43 that switches receivable wave bands, in place of UHF transmission and reception unit 23.

Figure 12:
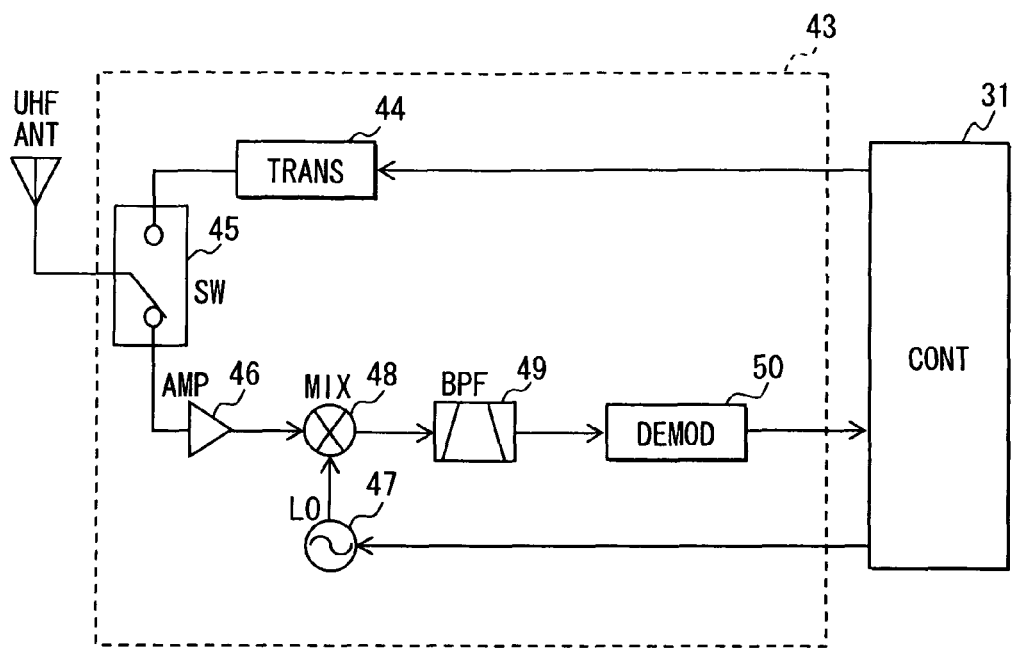
FIG. 12 is a block diagram showing schematic configuration of a UHF transmission and reception unit of the handset in the third embodiment.

Schematic configuration of UHF transmission and reception unit 43 of handset 2b is explained with reference to FIG. 12. In FIG. 12, a block diagram showing schematic configuration of UHF transmission and reception unit 43 of handset 2b is illustrated. UHF transmission and reception unit 43 includes transmission unit 44, switch (SW) 45, amplifier (AMP) 46, local oscillator (LO) 47, mixer (MIX) 48, band pass filter (BPF) 49, and demodulator 50 as shown in FIG. 12.

When information to be transmitted from UHF transmission and reception unit 43 is input from control unit 21 of handset 2b, this information is received by transmission unit 44, to be converted to the transmission signal, and the signal is transmitted from the UHF antenna. In addition, control unit 21 connects transmission unit 44 to the UHF antenna by switching switch 45 when the signal is transmitted from UHF transmission and reception unit 43.

In addition, control unit 21 switches switch 45 to connect amplifier 46 to the UHF antenna when a signal is received by UHF transmission and reception unit 43. Then, after a signal is received by the UHF antenna, the signal is input to amplifier 46, is then mixed with a signal from local oscillator 47 by mixer 48, is then input to band pass filter 49 for removing unnecessary frequency components, and is output to control unit 21 after demodulation by demodulator 50. In addition, the frequency band that can be received by UHF transmission and reception unit 43 can be changed because oscillation frequency of local oscillator 47 can be changed by instructions from control unit 21.

Figure 13:
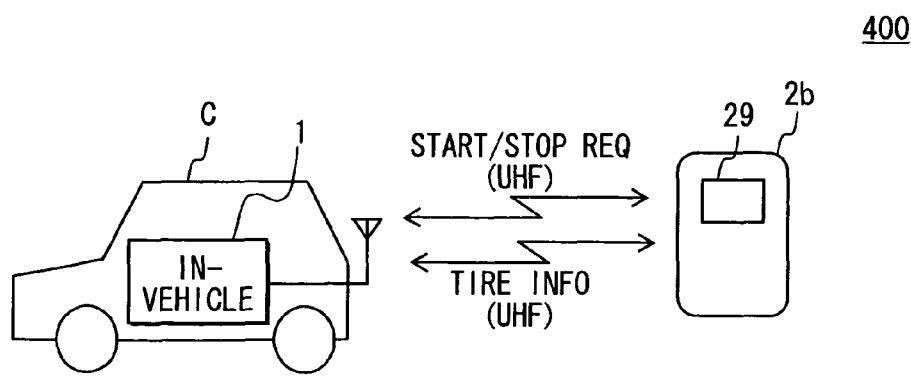
FIG. 13 is a schematic diagram showing information flow in the vehicle system in a fourth embodiment.
Figure 14:
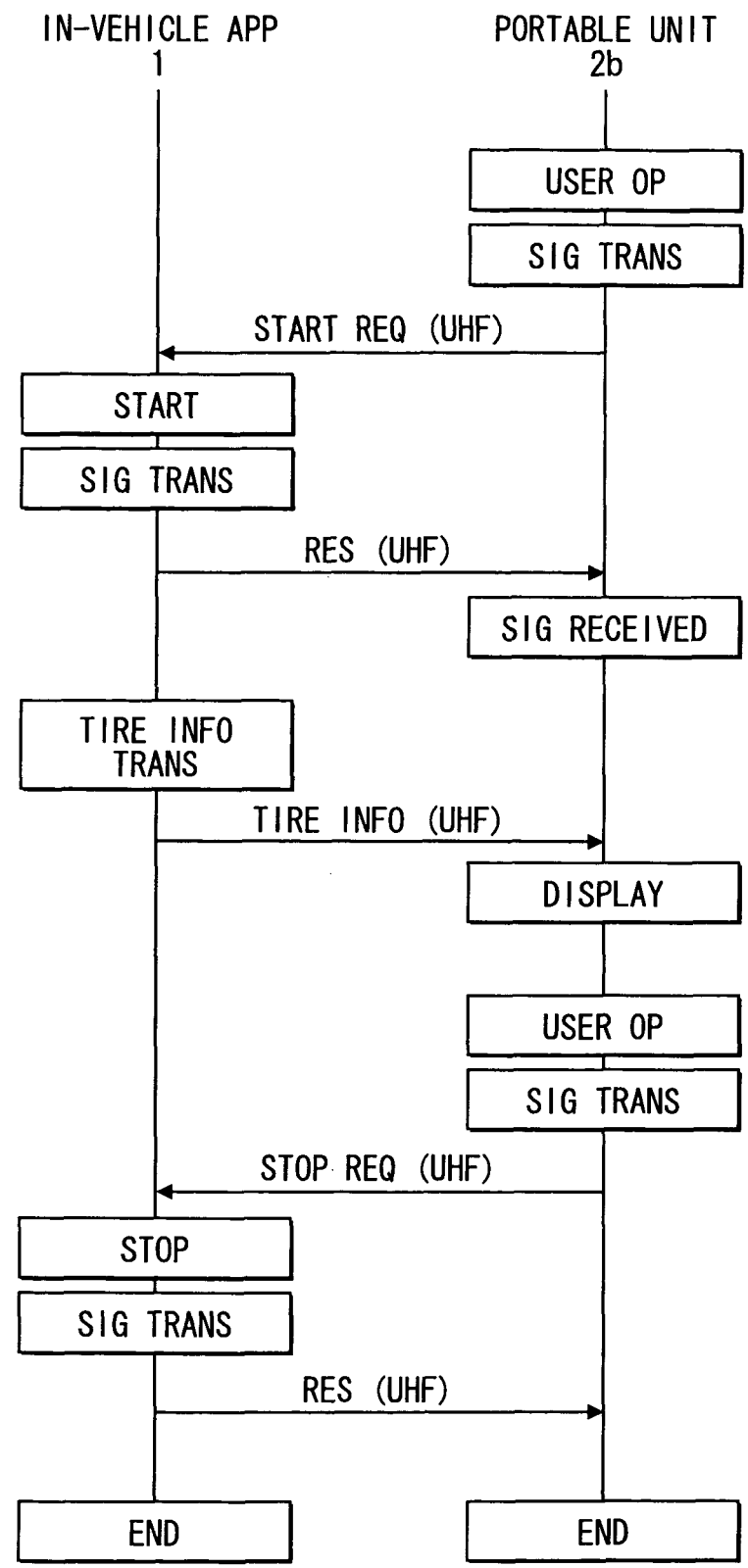
FIG. 14 is a sequence diagram showing information flow between the in-vehicle apparatus of the vehicle system and the handset in the fourth embodiment.

With reference to FIGS. 13 and 14, transmission of information of the air pressure of each tire of vehicle C detected by the pressure sensors of sensor units 15a to 15d of in-vehicle apparatus 1 to handset 2b is described. The information is, more practically, tire information including the information of the tire pressure. The transmission process is performed based on a request from handset 2b. As shown in FIG. 13, a schematic view showing information flow in vehicle system 400 is illustrated. The communication between handset 2b and in-vehicle apparatus 1 is performed by using the electric wave of UHF band. That is, communication concerned with the start/stop of in-vehicle apparatus 1, and communication to be concerned with the acquisition of the information of the air pressure of each tire of vehicle C are respectively performed by UHF wave as shown in FIG. 13.

In addition, the frequency band that can be received by UHF transmission and reception unit 43 is switched by changing oscillation frequency of local oscillator 47, so that UHF band used for communication concerned with the acquisition of the information of the air pressure of each tire and UHF band used for communication concerned with the start/stop request of in-vehicle apparatus 1 can both be accommodated by UHF transmission and reception unit 43 of handset 2b. In the following description, a mode for receiving the UHF frequency band of the electric wave used for communication concerned with the start/stop request of in-vehicle apparatus 1 by UHF transmission and reception unit 43 is designated as an entry mode for an entry system, and a mode for receiving the frequency band of UHF band used for communication concerned with the acquisition of the information of the air pressure of each tire of vehicle C by UHF transmission and reception unit 43 is designated as a TPMS mode.

Details of the information flow between handset 2b and in-vehicle apparatus 1 in vehicle system 400 are explained next with reference to FIG. 14. In FIG. 14, one example of information flow sequence between in-vehicle apparatus 1 and handset 2b is shown. In this case, in-vehicle apparatus 1 and handset 2b are assumed to be in a communicable area through the UHF band wave communication in terms of communication therebetween.

When a tire pressure acquisition operation is accepted by handset 2b for starting the acquisition of the information of the tire pressure of each tire of vehicle C from in-vehicle apparatus 1, control unit 21 of handset 2b switches UHF transmission and reception unit 43 to the entry mode. Then, control unit of handset 2b transmits the start request signal for switching the above-mentioned waiting components to the active mode from UHF transmission and reception unit 43 of handset 2b to in-vehicle apparatus 1 by the electric wave of UHF band after completion of switching to the entry mode. Therefore, UHF transmission and reception unit 43 serves as the transmission unit in claims. In addition, the above-mentioned operation may be considered as the same operation as described above with reference to the illustration in FIG. 4.

Then, UHF transmission and reception unit 13 of the entry system of in-vehicle apparatus 1 in waiting for the signal reception in the electric wave of UHF band receives the start request signal, and inputs the received signal into control unit 11 of in-vehicle apparatus 1, thereby switching the waiting components, except for UHF reception unit 14 of TPMS, to the active mode from the sleep mode. Then, the response signal showing that the waiting components, except for UHF reception unit 14 of TPMS, are switched to the active mode from the sleep mode according to instructions from control unit 11 is transmitted to handset 2b from UHF transmission and reception unit 13 of the entry system by the electric wave of UHF band. In this case, the above response signal may include relation information that relates the ID code of each sensor in sensor units 15a to 15d with sensor position of each sensor, for the purpose of information utilization by the destination device.

Then, control unit 21 of handset 2b switches UHF transmission and reception unit 43 to the TPMS mode after receiving the response signal which has been transmitted from UHF transmission and reception unit 13 of the entry system of in-vehicle apparatus 1 to UHF transmission and reception unit 43 of handset 2b.

Then, control unit 11 of in-vehicle apparatus 1 performs a tire information transmission process after transmitting, from UHF transmission and reception unit 13 of the entry system of in-vehicle apparatus 1, the response signal showing that waiting components, except for UHF reception unit 14 of TPMS, are switched to the active mode from the sleep mode. By the tire information transmission process, a transmission request signal is transmitted once for each of the sensor units 15a to 15d through LF transmission unit 12, that is, from left front wheel ANT 16b to sensor unit 15b, from right front wheel ANT 16a to sensor unit 15a, from left rear wheel ANT 16d to sensor unit 15d, and, from right rear wheel ANT 16c to sensor unit 15c, in this order. Therefore, tire pressure is detected in this order from sensor unit 15b, sensor unit 15a, sensor unit 15d, and from sensor unit 15c, in response to the transmission of the transmission request signal, and the tire information is then transmitted in this order to the wireless communication unit of sensor unit 15b, the wireless communication unit of sensor unit 15a, the wireless communication unit of sensor unit 15d, and wireless communication unit of sensor unit 15c by the UHF band wave.

After receiving the tire information transmitted from the wireless communication units of sensor units 15a to 15d to UPF transmission and reception unit 43 by the electric wave of UHF band, according to instructions of control unit 21 of handset 2b, the information of the tire pressure of each tire is displayed on display 29 based on the received tire information received by UHF transmission and reception unit 43 of handset 2b. Therefore, UHF transmission and reception unit 43 serves as the receiver unit in claims.

Then, when the tire pressure acquisition stop operation transmitted from in-vehicle apparatus 1 is received by handset 2b, control unit 21 of handset 2b switches UHF transmission and reception unit 43 of handset 2b to the entry mode. Then, control unit 21 transmits the stop request signal from UHF transmission and reception unit 43 to in-vehicle apparatus 1 by the electric wave of UHF band upon completion of switching to the entry mode, for switching the above-mentioned waiting components back to the sleep mode. The tire pressure acquisition stop operation may be performed in the same manner as the tire pressure acquisition operation that is previously described.

Then, UHF transmission and reception unit 13 of the entry system of in-vehicle apparatus 1 receives the stop request signal, and inputs the signal to control unit 11 of in-vehicle apparatus 1, and switches the waiting components, except for UHF reception unit 14 of TPMS, from the active mode to the sleep mode. Then, the response signal showing that the waiting components, except UHF reception unit 14 of TPMS, are switched from the active mode to the sleep mode is transmitted from UHF transmission and reception unit 13 of the entry system to handset 2b by the electric wave of UHF band, and the process in in-vehicle apparatus 1 is concluded. On the other hand, the process in handset 2b is also concluded after receiving the response signal showing that the waiting components, except for UHF reception unit 14 of TPMS, are switched from the active mode to the sleep mode, which has been transmitted from UHF transmission and reception unit 13 of the entry system of in-vehicle apparatus 1 to UHF transmission and reception unit 43 of handset 2b.

The above configuration is advantageous, because the tire information, including tire pressure information, can be directly received by UHF transmission and reception unit 43 of handset 2b without performing a process that collects the information by control unit 11 of in-vehicle apparatus 1, from the pressure sensors of sensor units 15a to 15d by using the UHF band electric wave. That is, in other words, UHF reception unit 14 of TPMS needs not be turned on (i.e., switched to the active mode) for collecting the information by control unit 11 from the pressure sensors of sensor units 15a to 15d. Therefore, the battery consumption by UHF reception unit 14 of TPMS can be reduced.

In the above embodiment, handset 2b acquires the information of the tire pressure of vehicle C detected by the air pressure sensors of sensor units 15a to 15d of in-vehicle apparatus 1, and displays the acquired tire pressure information on display 29 of handset 2b, without collecting the tire information to control unit 11 of in-vehicle apparatus 1. However, for example, once a certain handset acquires the tire pressure information from the pressure sensors of sensor units 15a to 15d of in-vehicle apparatus 1, the certain handset may relay the information to a certain communication terminal, and the certain communication terminal may display the tire pressure information on a display unit on the terminal. An example of such a configuration is described as vehicle system 500 with reference to FIGS. 15 to 16. In the following description, like parts have like numbers, and only the difference from the above embodiment is described.

Vehicle system 500 includes in-vehicle apparatus 1, handset 2c and cellular phone 3. Handset 2c has the same configuration as handset 2b except that handset 2c does not have display 29.

Figure 15:
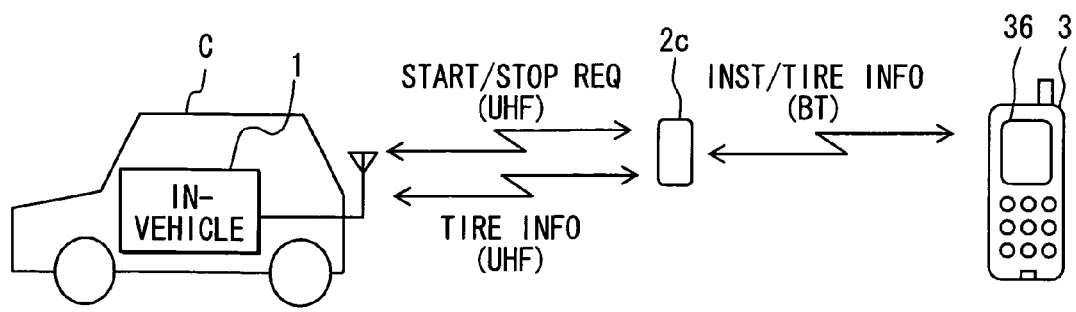
FIG. 15 is a schematic diagram showing information flow in the vehicle system in a fifth embodiment.
Figure 16:
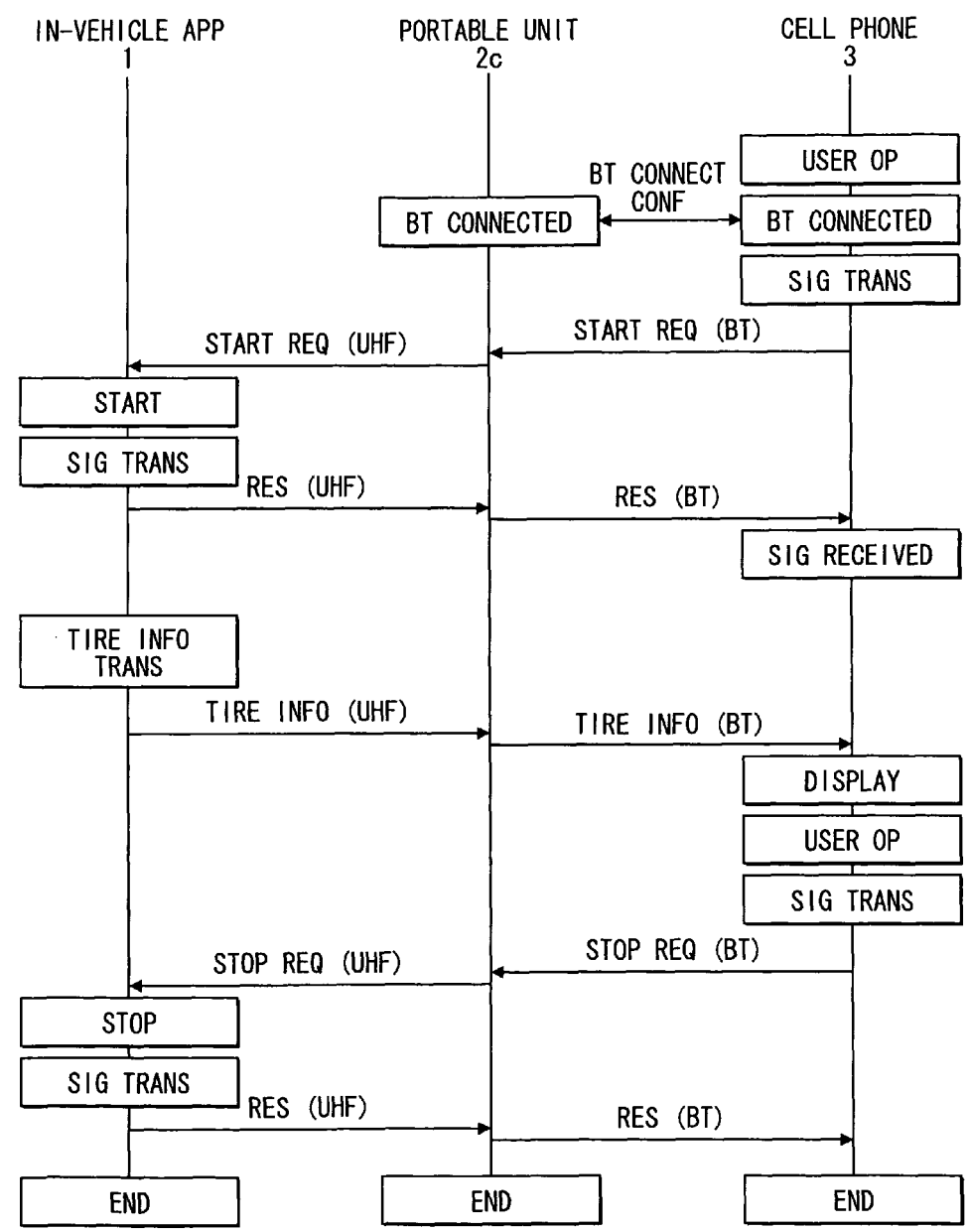
FIG. 16 is a sequence diagram showing information flow between the in-vehicle apparatus of the vehicle system, the handset and the cellular phone in the fifth embodiment.

With reference to FIGS. 15 and 16, transmission of information of the air pressure of each tire of vehicle C to cellular phone 3 through handset 2c from in-vehicle apparatus 1 is described. The transmission process is performed based on a request from cellular phone 3 through handset 2c. As shown in FIG. 15, a schematic view showing information flow in vehicle system 500 is illustrated. The communication between handset 2a and in-vehicle apparatus 1 is performed by using the electric wave of UHF band for both of a start/stop request of in-vehicle apparatus 1 and for acquisition of the information of the air pressure from each tire of vehicle C. Further, the communication between cellular phone 3 and handset 2c concerned with control instructions to handset 2c and the acquisition of the information of the air pressure of each tire of vehicle C from handset 2c is performed by the communication protocol of BT method, by using the electric wave of 2.4 GHz band.

In addition, UHF transmission and reception unit 43 of handset 2c switches the frequency of UHF bands for accommodating both of start/stop communication to in-vehicle apparatus 1 and tire pressure acquisition communication to in-vehicle apparatus 1. The frequency band switching is performed by changing the oscillation frequency of local oscillator 47. In the following description, as in the above embodiment, a mode for receiving the UHF frequency band of the electric wave used for the start/stop communication to in-vehicle apparatus 1 by UHF transmission and reception unit 43 is designated as an entry mode, and a mode for receiving the UHF frequency band used for communication concerned with the acquisition of the information of the air pressure of each tire of vehicle C by UHF transmission and reception unit 43 is designated as a TPMS mode.

Details of the information flow between cellular phone 3, handset 2c, and in-vehicle apparatus 1 in vehicle system 500 are explained next with reference to FIG. 16. In FIG. 16, one example of information flow sequence between in-vehicle apparatus 1 in vehicle system 500, handset 2a and cellular phone 3 is shown. In this case, in-vehicle apparatus 1 and handset 2c are assumed to be in a communicable area through the UHF band wave communication in terms of communication therebetween. Also, handset 2c and cellular phone 3 are assumed to be in a communicable area through the BT communication in terms of communication therebetween.

At first, control unit 31 of cellular phone 3 tries BT connection between BT communication unit 32 of cellular phone 3 and BT communication unit 24 of handset 2c, when an operation input instructing a start of the acquisition of the information of the tire pressure of each tire of vehicle C from in-vehicle apparatus 1 is received by operation input unit 34 of cellular phone 3. Then, after establishing BT connection between BT communication unit 24 and BT communication unit 32, control unit 31 of cellular phone 3 transmits to handset 2c the start request signal for switching the waiting components, except for UHF reception unit 14 of TPMS, to the active mode by the communication protocol of BT method, by using the electric wave of 2.4 GHz band.

Then, control unit 21 of handset 2c switches UHF transmission and reception unit 43 of handset 2c to the entry mode after receiving the response signal which has been transmitted from BT communication unit 32 of cellular phone 3 to UHF transmission and reception unit 43 of handset 2c. Then, after completion of switching, control unit 21 transmits from UHF transmission and reception unit 43 the start request signal to in-vehicle apparatus 1 by the electric wave of UHF band.

Then, UHF transmission and reception unit 13 of the entry system of in-vehicle apparatus 1 in waiting for the signal reception in the electric wave of UHF band receives the start request signal, and inputs the received signal into control unit 11 of in-vehicle apparatus 1, thereby switching the waiting components, except for UHF reception unit 14 of TPMS, to the active mode from the sleep mode. Then, the response signal showing that the waiting components, except for UHF reception unit 14 of TPMS, are switched to the active mode from the sleep mode according to instructions from control unit 11 is transmitted to handset 2c from UHF transmission and reception unit 13 of the entry system by the electric wave of UHF band.

Then, control unit 21 of handset 2c switches UHF transmission and reception unit 43 to the TPMS mode after receiving the response signal which has been transmitted from UHF transmission and reception unit 13 of the entry system of in-vehicle apparatus 1 to UHF transmission and reception unit 43 of handset 2c. Then, after completion of mode switching, control unit 21 transmits the response signal from BT communication unit 24 of handset 2c to cellular phone 3 by the electric wave of 2.4 GHz band according to the communication protocol based on BT method.

Then, after receiving by BT communication unit 32 of cellular phone 3 the response signal showing that the active mode of the waiting components, except for UHF reception unit 14 of TPMS, are switched to the sleep mode, which has been transmitted from BT communication unit 24 of handset 2c, control unit 31 of cellular phone 3 puts BT communication unit 32 in a condition for waiting for reception of signals transmitted by the electric wave of 2.4 GHz band according to the communication protocol based on BT method.

Then, control unit 11 of in-vehicle apparatus 1 performs a tire information transmission process after transmitting, from UHF transmission and reception unit 13 of the entry system of in-vehicle apparatus 1, the response signal showing that waiting components, except for UHF reception unit 14 of TPMS, are switched to the active mode from the sleep mode. Then, after receiving the tire information transmitted from the wireless communication units of sensor units 15a to 15d to UHF transmission and reception unit 43 by the electric wave of UHF band, according to instructions of control unit 21 of handset 2c, control unit 21 transmits the tire information to cellular phone 3 by the electric wave of 2.4 GHz band from BT communication unit 24 according to the communication protocol based on BT method.

The tire pressure of each tire is, for example, displayed on display 36 based on the tire information according to the instructions of control unit 31, after receiving the tire information by BT communication unit 32 of cellular phone 3 that is waiting for the signal transmission.

Then, upon receiving an operation input for stopping the acquisition of the information of the tire pressure of each tire of vehicle C is input from operation input unit 34 of cellular phone 3, control unit 31 of cellular phone 3 transmits the stop request signal from BT communication unit 32 of cellular phone 3 to handset 2c by the electric wave of 2.4 GHz band according to the communication protocol based on BT method, in order to switch the waiting components back to the sleep mode.

Further, control unit 21 of handset 2c switches UHF transmission and reception unit 43 of the entry system to the entry mode when the stop request signal which has been transmitted from BT communication unit 32 of cellular phone 3 to BT communication unit 24 of handset 2c. Upon completion of the mode switching, control unit 21 of handset 2c transmits the stop request signal from UHF transmission and reception unit 23 of handset 2c to in-vehicle apparatus 1 by the electric wave of UHF band.

Then, UHF transmission and reception unit 13 of the entry system of in-vehicle apparatus 1 receives the stop request signal, and inputs the signal to control unit 11 of in-vehicle apparatus 1, thereby switching the waiting components, except for UHF reception unit 14 of TPMS, from the active mode to the sleep mode. Then, according to instructions from control unit 11, the response signal showing that the waiting components, except for UHF reception unit 14 of TPMS, are switched from the active mode to the sleep mode is transmitted from UHF transmission and reception unit 13 of the entry system to handset 2c by the electric wave of UHF band, and the process in in-vehicle apparatus 1 is concluded.

Further, control unit 21 of handset 2c transmits the response signal from BT communication unit 24 of handset 2c to cellular phone 3 by the electric wave of 2.4 GHz band according to the communication protocol based on BT method, after receiving the response signal showing that the waiting components, except for UHF reception unit 14 of TPMS, are switched from the active mode to the sleep mode, which has been transmitted from UHF transmission and reception unit 13 of the entry system of in-vehicle apparatus 1 to UHF transmission and reception unit 43 of handset 2c, and then the process in handset 2c is concluded. After receiving the response signal showing that the waiting components, except for UHF reception unit 14 of TPMS, are switched from the active mode to the sleep mode, which has been transmitted from BT communication unit 24 of handset 2c to BT communication unit 32 of cellular phone 3, the process in cellular phone 3 is concluded.

The above configuration is advantageous, because the tire information, including tire pressure information, can be directly received by UHF transmission and reception unit 43 of handset 2c without performing a process that collects the information by control unit 11 of in-vehicle apparatus 1, from the pressure sensors of sensor units 15a to 15d by using the UHF band electric wave. That is, in other words, UHF reception unit 14 of TPMS needs not be turned on (i.e., switched to the active mode) for collecting the information by control unit 11 from the pressure sensors of sensor units 15a to 15d. Therefore, the battery consumption by UHF reception unit 14 of TPMS can be reduced.

Although the present disclosure has been fully described in connection with preferred embodiment thereof with reference to the accompanying drawings, it is to be noted that various changes and modifications will become apparent to those skilled in the art.

For example, in-vehicle apparatus 1 may transmit the LF command (i.e., the transmission request signal) once to the pressure sensor of each of four tires in turn and automatically conclude the process in in-vehicle apparatus 1 without receiving the stop request signal, when apparatus 1 receives the start request signal from handset 2b or 2c. In this manner, the user needs not perform the stop operation to stop the process in in-vehicle apparatus 1, and unnecessary tire pressure detection can be reduced, thereby reducing the battery consumption, when, for example, the user just wants to confirm the tire pressure of the vehicle.

Further, in the above embodiment, wireless communication between in-vehicle apparatus 1, handset 2/2a/2b/2c, and cellular phone 3 is assumed to be using BT method and/or a method using the electric wave of UHF band. However, wireless communication between those devices may use a combination of various methods, as long as the methods do not interfere with each other.

Furthermore, the communication terminal carried by the user may not necessarily be the cellular phone, but any communication terminal that can be carried by the user, such as a personal digital assistant (PDA) terminal or the like.

Furthermore, the handset may not necessarily be a device having the electric key function, but any device that can be carried by the user, such as a personal digital assistant (PDA) terminal, a cellular phone, or the like.

Such changes, modifications, and summarized schemes are to be understood as being within the scope of the present disclosure as defined by appended claims.

What is claimed is:

1. A vehicular system comprising:
a pressure detector for detecting a tire pressure of tires of a vehicle;
a communication terminal including a terminal transmitter and a terminal receiver; and
a handset including a receiver unit and a transmission unit, wherein
the combination terminal and the handset are carried by the user;
the terminal transmitter of the communication terminal transmits a forced-operation signal to forcefully operate the pressure detector to the handset,
the transmission unit of the handset transmits the forced-operation signal received from the communication terminal by the receiver unit to the pressure detector via an entry system of the vehicle, and
the terminal receiver receives tire pressure information from the pressure detector.

2. The vehicular system of claim 1 wherein:
the receiver unit of the handset receives the tire pressure information detected by the pressure detector, and
the terminal receiver acquires the tire pressure information from the handset.

3. The vehicular system of claim 1 wherein:
the communication terminal further includes a terminal display that displays the tire pressure information received by the terminal receiver.

4. The vehicular system of claim 1, wherein
the communication terminal is a cellular phone.

5. The vehicular system of claim 1, wherein
the pressure detector includes:
a tire sensor disposed in each tire for detecting air pressure in each tire;
a wireless communication unit for transmitting the tire pressure information detected by the tire sensor in each tire;
a collection unit for collecting the tire pressure information by receiving the tire pressure information transmitted by the wireless communication unit;
a detector transmitter for transmitting the tire pressure information collected by the collection unit; and
a detection signal transmitter for transmitting to each of the tire sensors a detection instruction signal for pressure detection when the forced-operation signal is transmitted from the transmission unit of the handset,
the tire pressure information is collected by the collection unit from each tire in response to the detection instruction signal transmitted from the detection signal transmitter, and
the collected tire pressure information is transmitted from the detector transmitter.

6. The vehicular system of claim 5, wherein
the receiver unit receives the tire pressure information from the detector transmitter for acquiring the tire pressure information from the pressure detector in each tire.

7. The vehicular system of claim 5, wherein
the terminal receiver receives the tire pressure information from the detector transmitter.

8. The vehicular system of claim 5, wherein
the forced-operation signal from the transmission unit of the handset is transmitted in UHF band radio wave, and
the tire pressure information from the detector transmitter of the pressure detector is transmitted according to a communication protocol in the Bluetooth communication standard.

9. The vehicular system of claim 5, wherein
the detection signal transmitter transmits the detection instruction signal one by one to the tire sensor in each tire in order, and
the collection unit collects the tire pressure information one by one from the tire sensor in each tire in response to the detection instruction signal transmitted from the detection signal transmitter.

10. A vehicular system comprising:
a pressure detector for detecting a tire pressure of tires of a vehicle; and
a handset that is carried by a user, wherein
the handset includes:
a transmission unit for wirelessly transmitting a forced-operation signal to forcefully operate the pressure detector; and a receiver unit for wirelessly receiving tire pressure information detected by the pressure detector; wherein the pressure detector includes:
- a tire sensor disposed in each tire for detecting air pressure in each tire;
- a wireless communication unit for transmitting the tire pressure information detected by the tire sensor in each tire;
- a collection unit for collecting the tire pressure information by receiving the tire pressure information transmitted by the wireless communication unit;
- a detector transmitter for transmitting the tire pressure information collected by the collection unit; and
- a detection signal transmitter for transmitting to each of the tire sensors a detection instruction signal for pressure detection when the forced-operation signal is transmitted from the transmission unit of the handset, the tire pressure information is collected by the collection unit from each tire in response to the detection instruction signal transmitted from the detection signal transmitter, and the collected tire pressure information is transmitted from the detector transmitter; wherein the vehicle system further comprises:

a first determination unit for determining whether any tire sensor transmits a pressure change exceeding a threshold based on the tire pressure information collected by the collection unit, wherein, when at least one of the tire sensor is determined by the first determination unit to transmit the pressure change exceeding the threshold, the detection instruction signal is transmitted only to the tire sensor that is determined to transmit the pressure change exceeding the threshold, in order to collect the tire pressure information from the tire sensor.

11. The vehicular system of claim 10 further comprising:
a second determination unit for determining whether the tire sensor determined to have exceeding-the-threshold pressure change by the first determination unit has a stable tire pressure for a predetermined period.

12. The vehicular system of claim 1 wherein:
the pressure detector includes:
- a tire sensor disposed in each tire for detecting air pressure in each tire;
- a wireless communication unit for transmitting the tire pressure information detected by the tire sensor in each tire;
- a detection signal transmitter for transmitting to each of the tire sensor a detection instruction signal for pressure detection when the forced-operation signal is transmitted from the transmission unit of the handset.

13. The vehicular system of claim 12, wherein
the receiver unit receives the tire pressure information from the wireless communication unit for acquiring the tire pressure information from the pressure detector in each tire.

14. The vehicular system of claim 12, wherein
the forced-operation signal from the transmission unit of the handset is transmitted in UHF band radio wave, and
the tire pressure information from the wireless communication unit of the pressure detector is transmitted in UHF band radio wave in a different frequency used by the transmission unit.

15. The vehicular system of claim 14, wherein
the receiver unit of the handset is capable of receiving multiple frequencies of UHF band radio wave in a switchable manner, so that the receiver unit receives both of a response signal transmitted in response to the forced-operation signal from the transmission unit of the handset in one UHF band frequency and the tire pressure information transmitted from the wireless communication unit of the pressure detector in another UHF band frequency.

16. The vehicular system of claim 1, wherein
the handset is equipped with an electric key function of the vehicle.

17. A handset of a vehicular system which is carried by a user comprising:
- a transmission unit for wirelessly transmitting a forced-operation signal via an entry system of the vehicle to forcefully operate a pressure detector disposed in a vehicle;
- a receiver unit for wirelessly receiving tire pressure information detected by the pressure detector; and
- a display unit in the handset for displaying the tire pressure information received by the receiver unit.

18. A handset of a vehicular system which is carried by a user comprising:
- a handset transmission unit for wirelessly transmitting a forced-operation signal via an entry system of the vehicle to forcefully operate a pressure detector disposed in a vehicle;
- a handset receiver unit for wirelessly receiving tire pressure information detected by the pressure detector; and
- a mediation unit for wirelessly transmitting the tire pressure information received by the receiver unit to a communication terminal having a terminal display for displaying the tire pressure information received by the handset receiver unit.

19. The vehicular system of claim 1, wherein the communication terminal is separate from the handset.

20. The vehicular system of claim 2 further comprising:
A display unit in the handset for displaying the pressure information received by the receiver unit.

* * * * *